Figure 20:
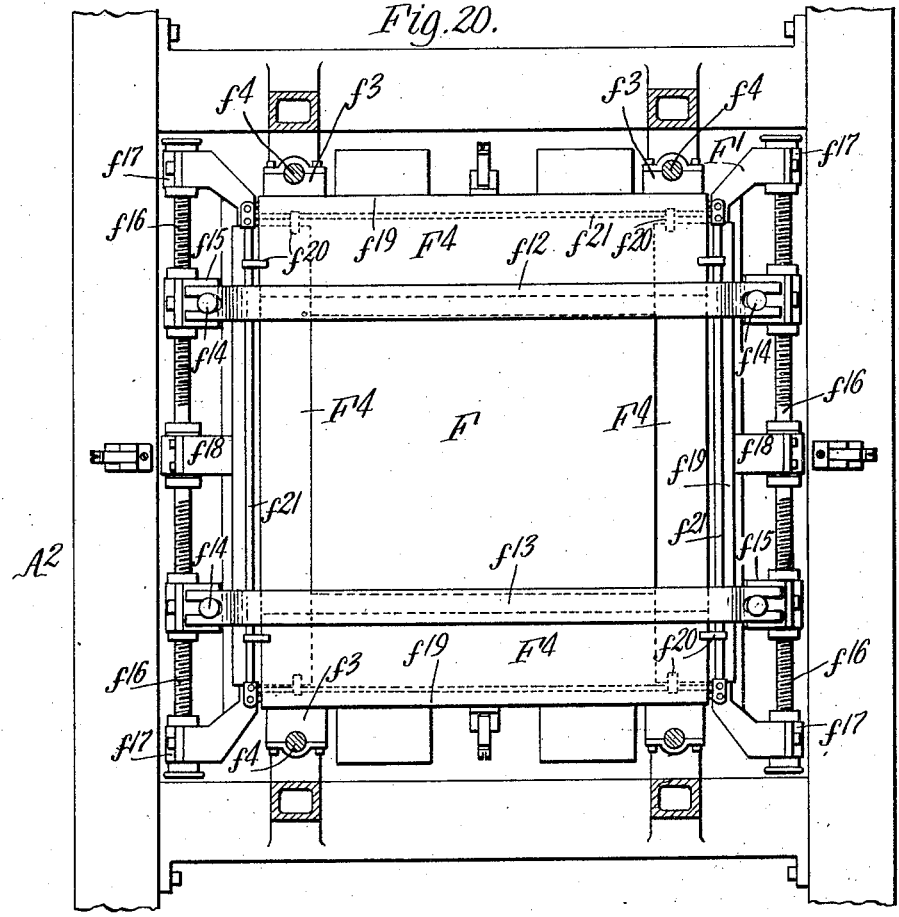

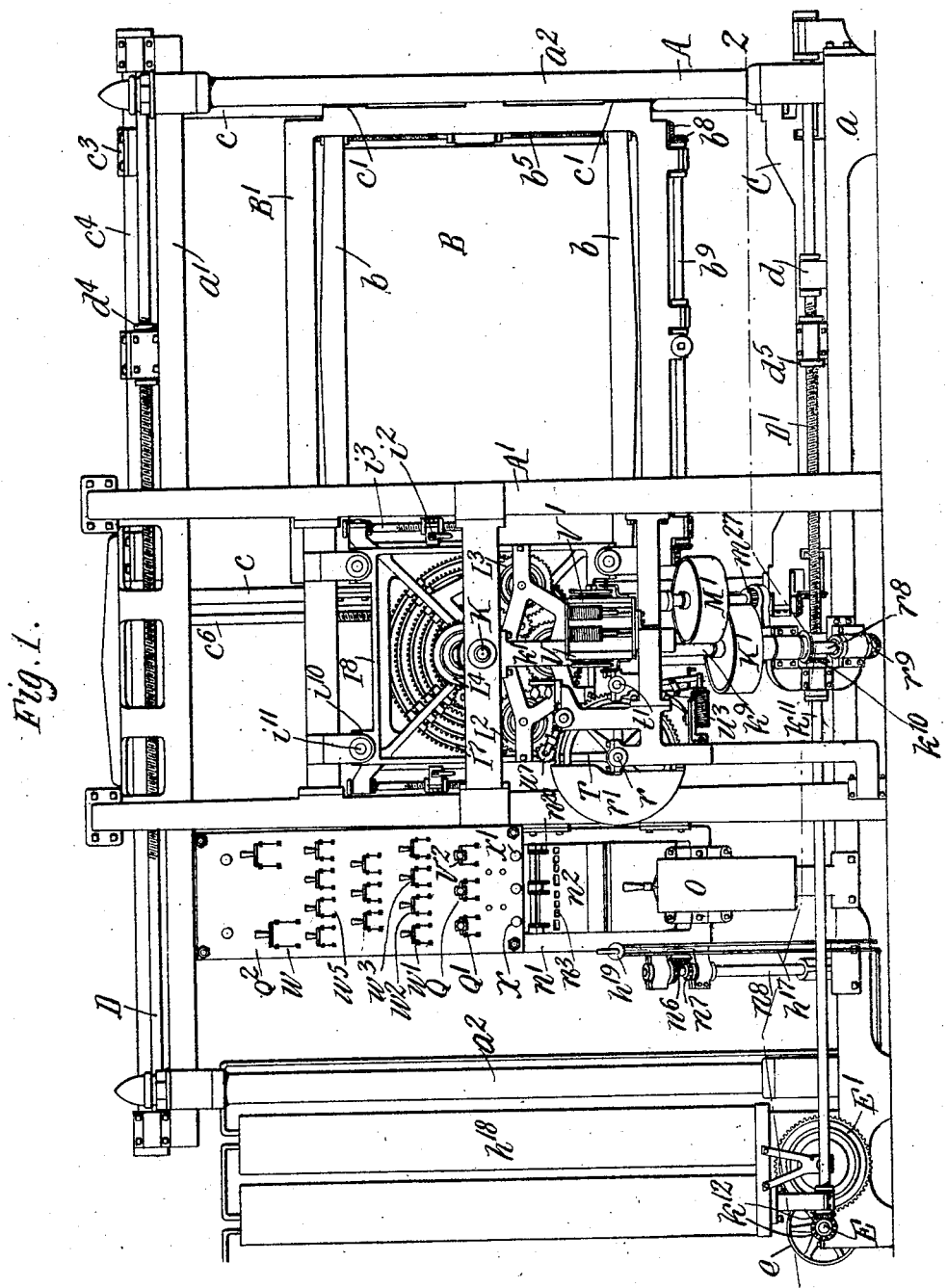

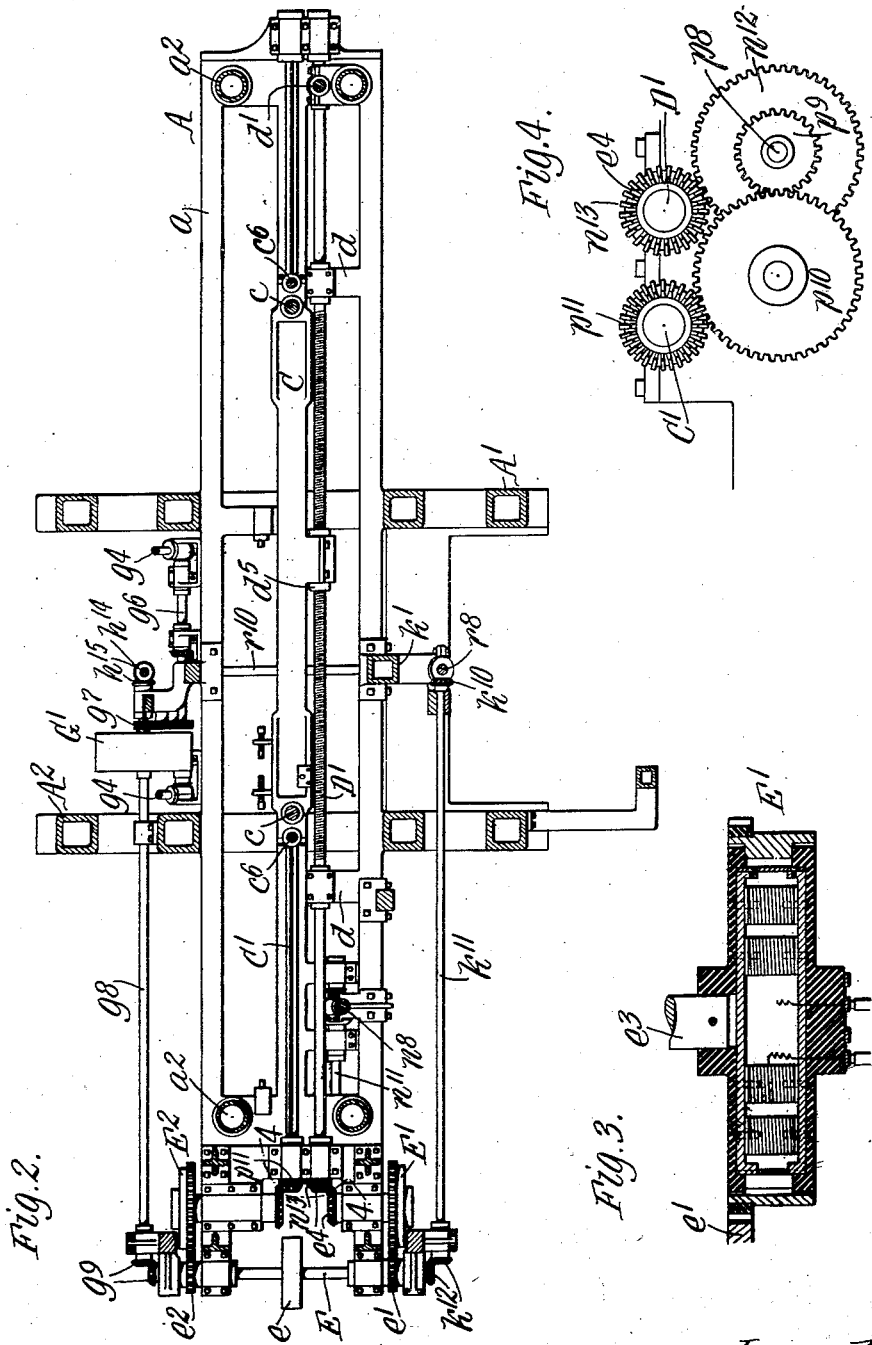

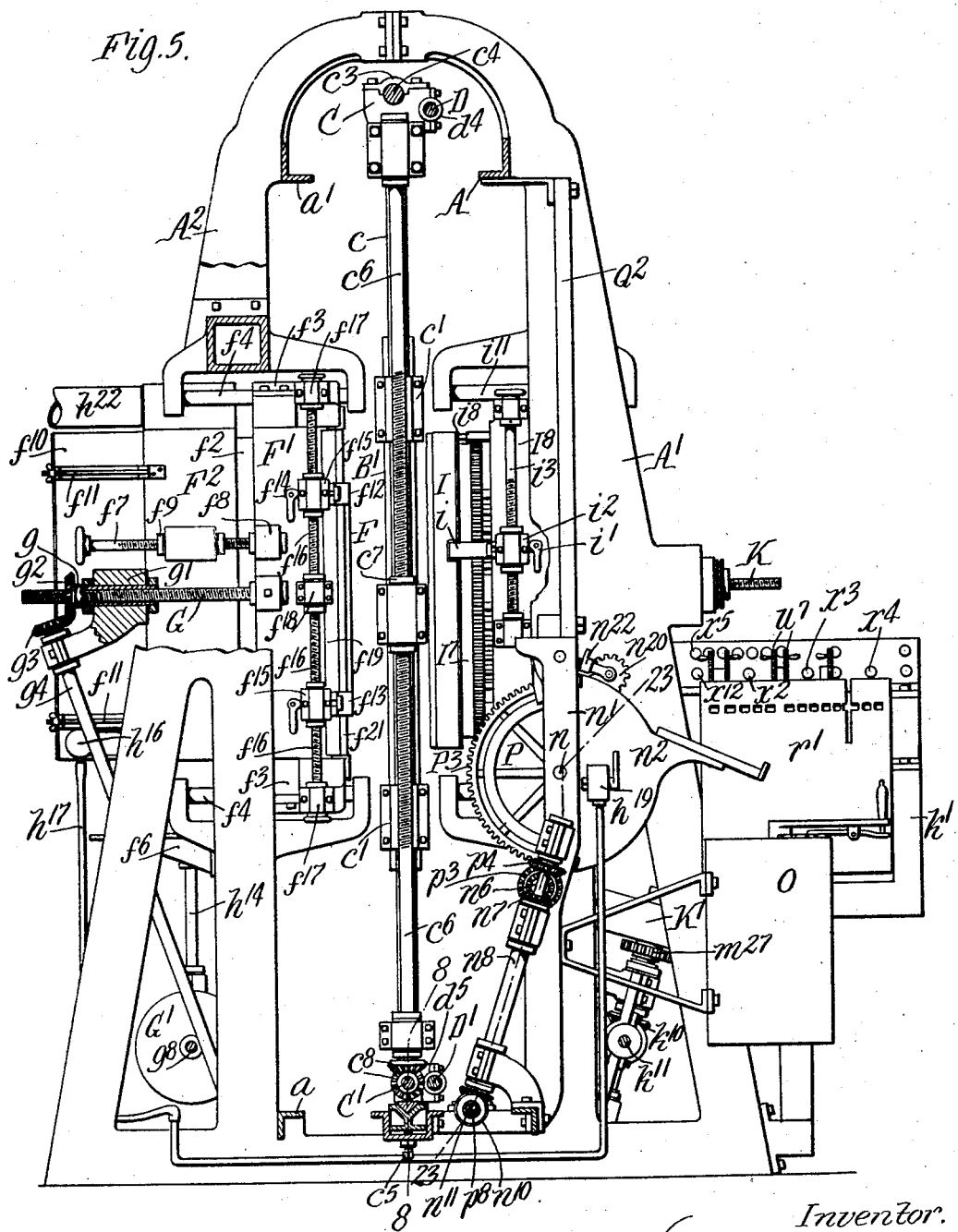

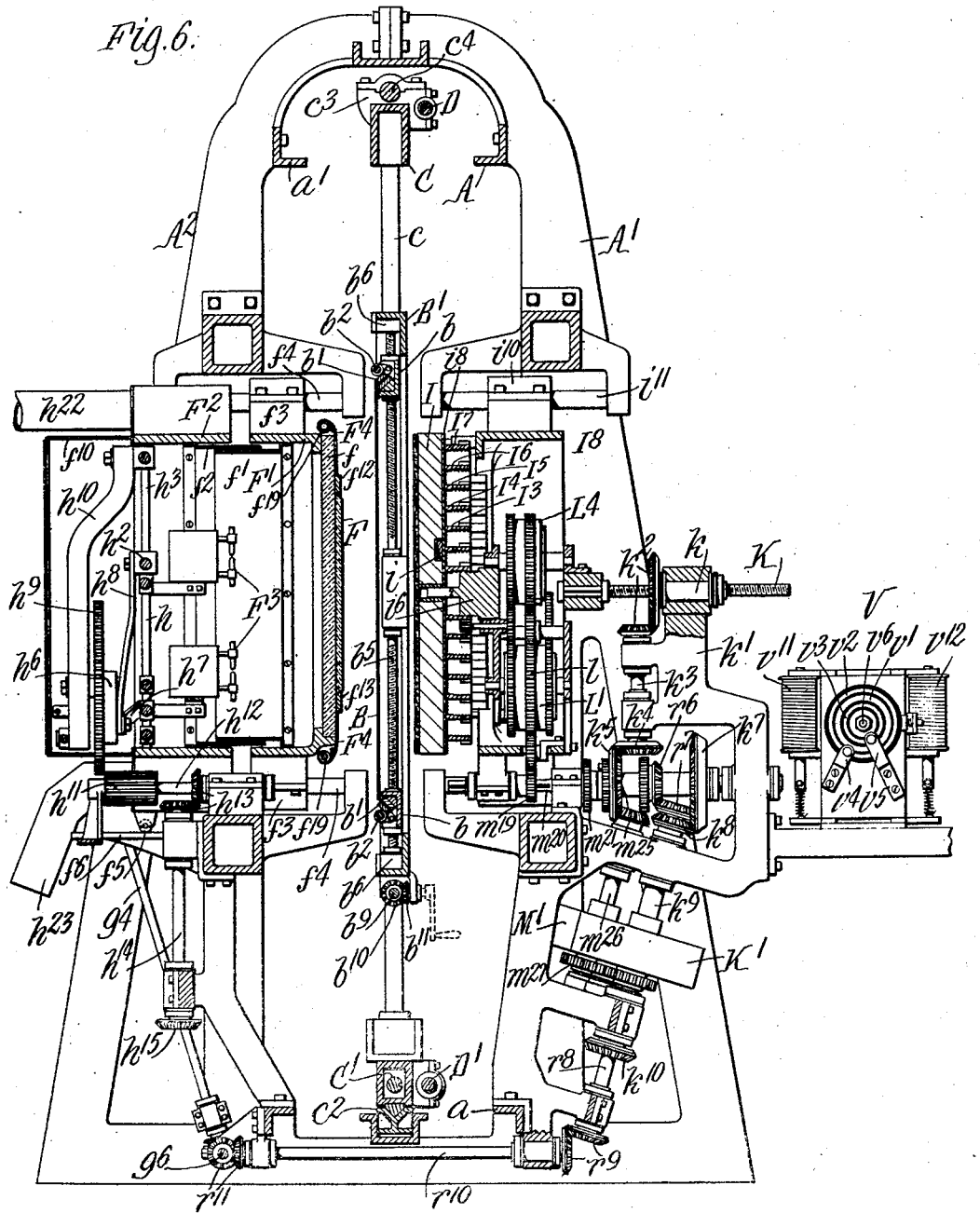

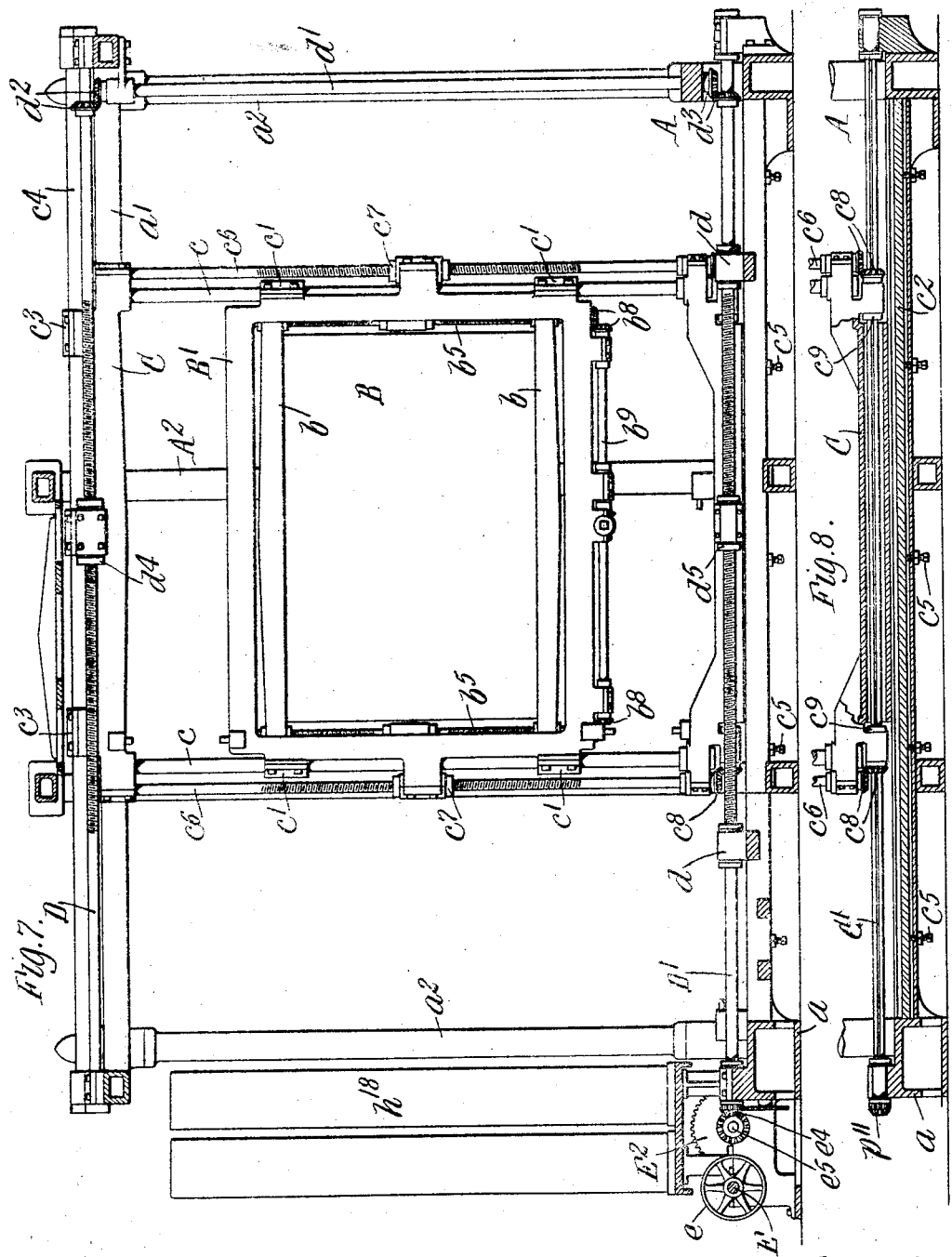

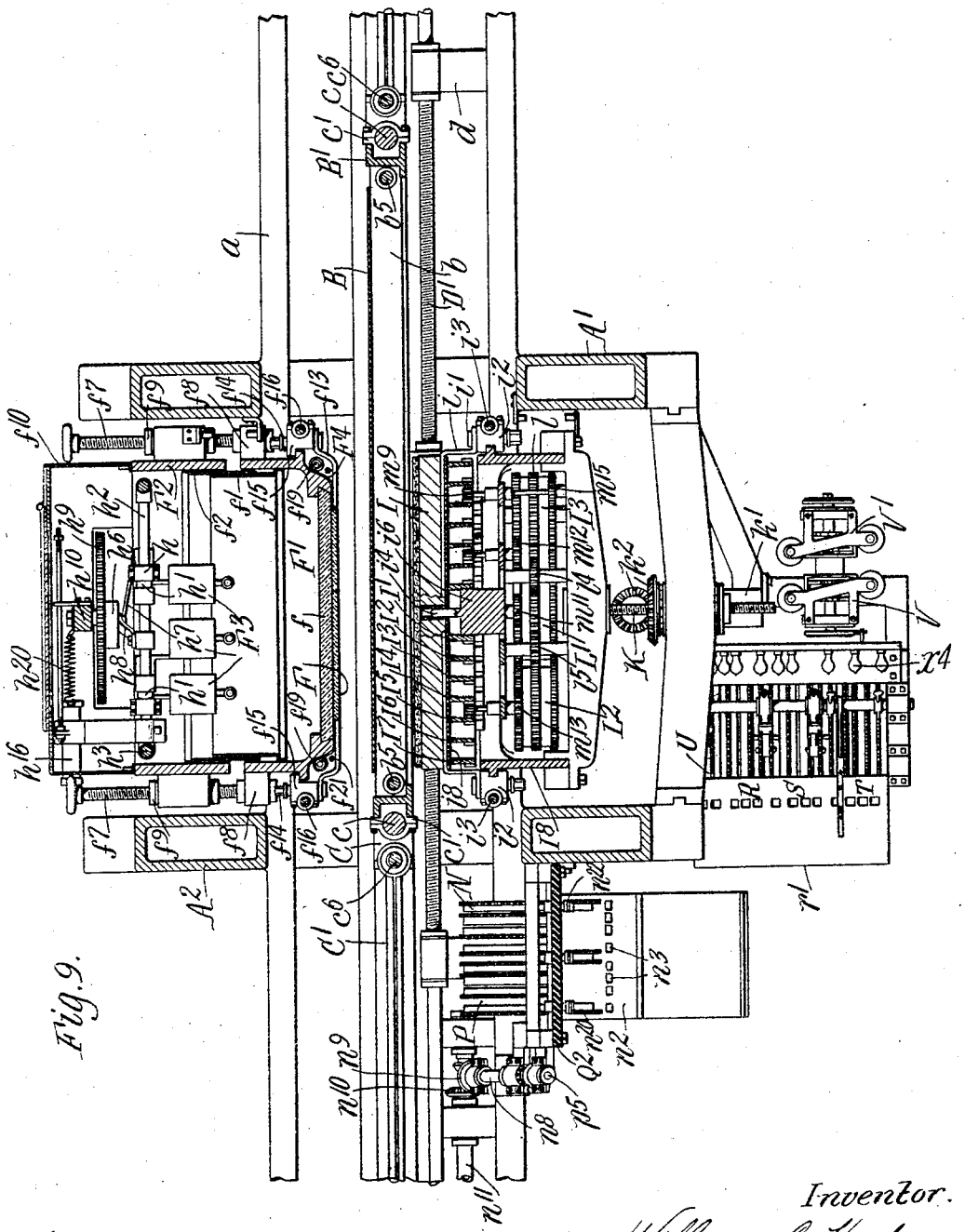

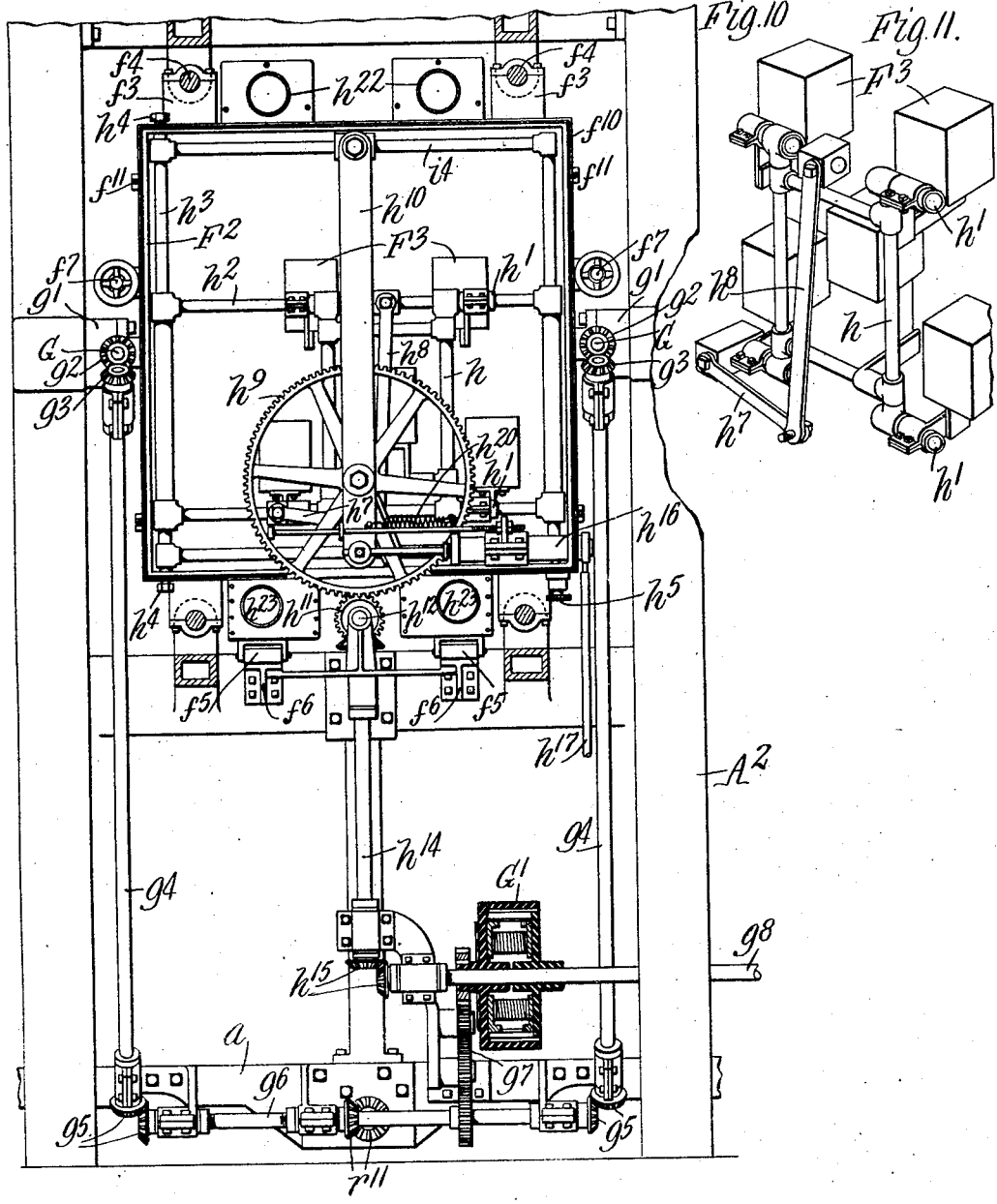

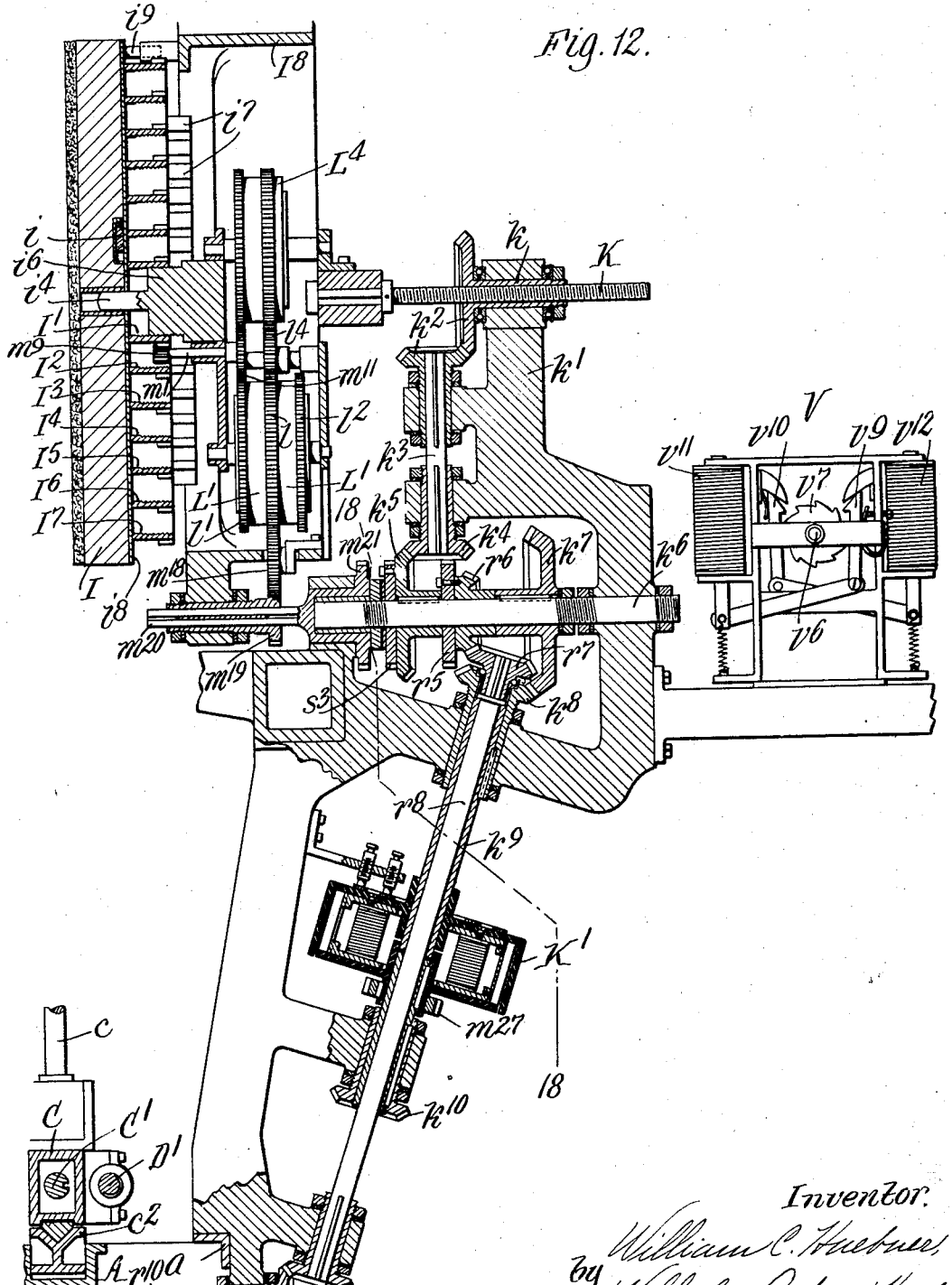

W. C. HUEBNER.
PHOTOGRAPHIC PRINTING MACHINE.
APPLICATION FILED MAY 12, 1910.
1,015,681.
Patented Jan. 23, 1912.
23 SHEETS—SHEET 9.
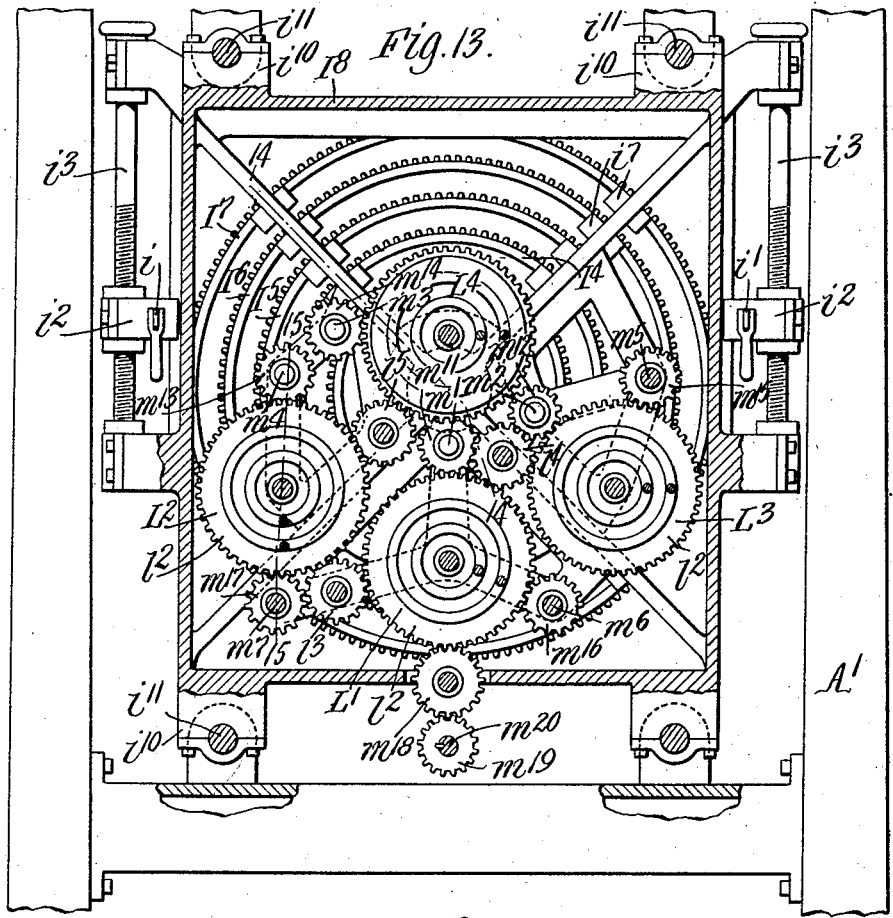
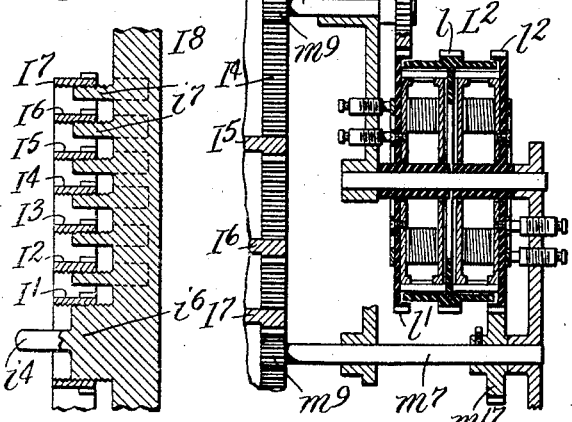
Witnesses:
E. A. Volk.
C. H. Bund
Inventor.
William C. Huebner,
by Wilhelm, Parker & Hard,
Attorneys.

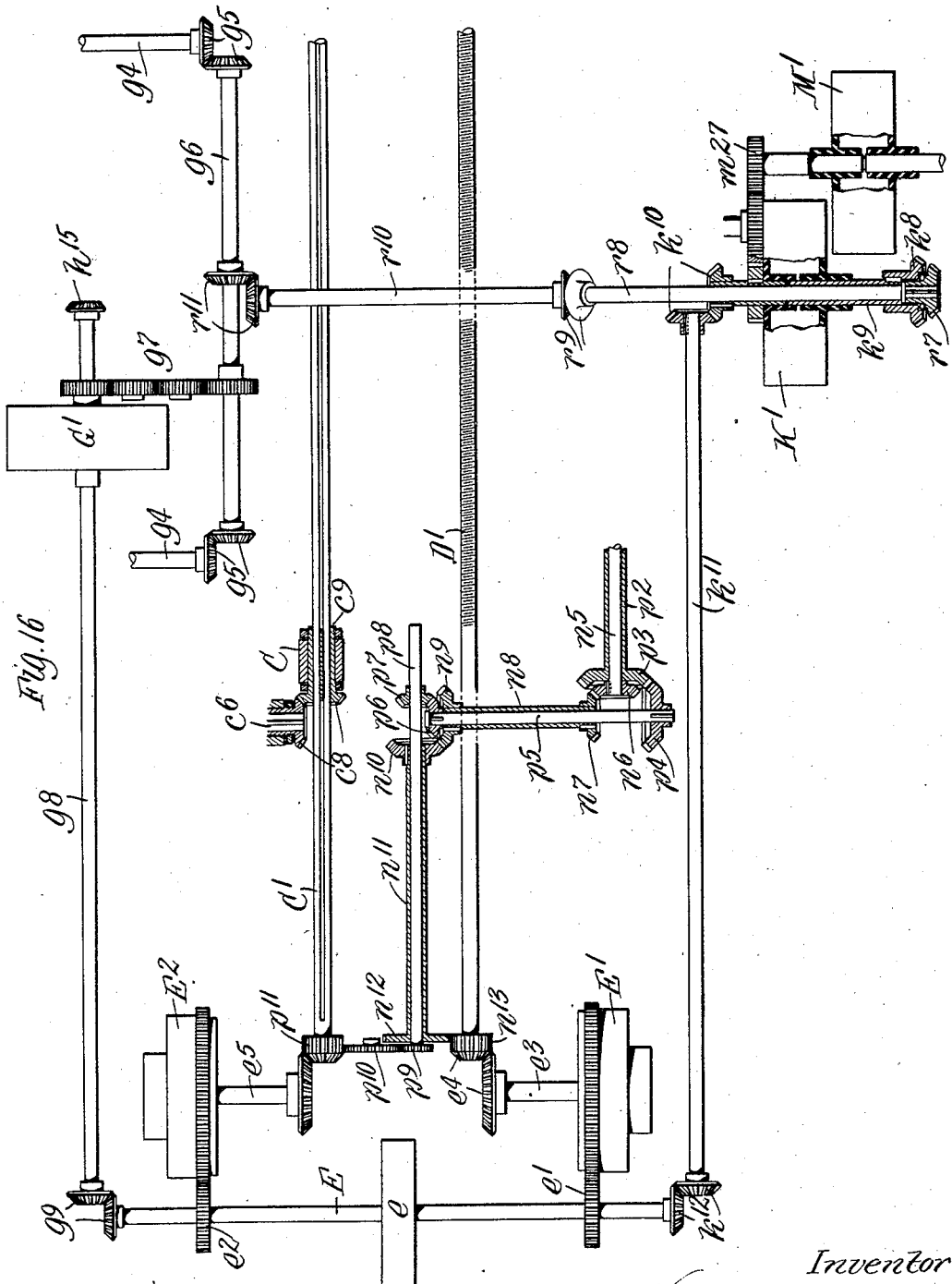

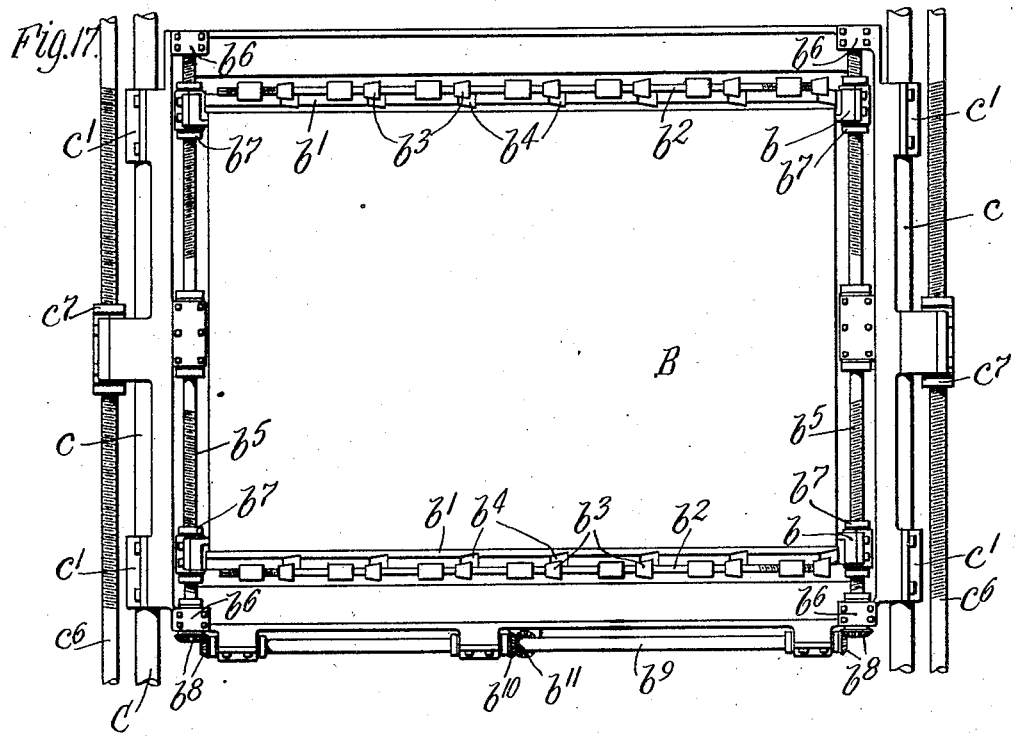
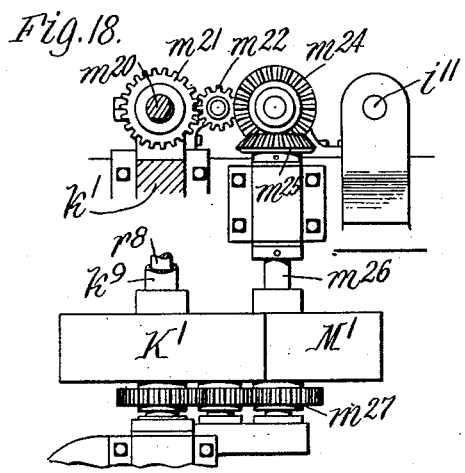
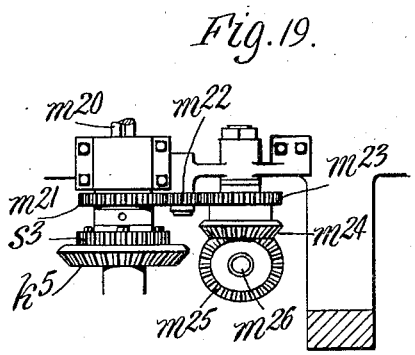

W. C. HUEBNER.
PHOTOGRAPHIC PRINTING MACHINE.
APPLICATION FILED MAY 12, 1910.

1,015,681.

Patented Jan. 23, 1912.
23 SHEETS—SHEET 12.

Witnesses:
E. A. Volk
C. H. Bund.

Inventor.
William C. Huebner,
by Wilhelm, Parker & Hard,
Attorneys.

W. C. HUEBNER.
PHOTOGRAPHIC PRINTING MACHINE.
APPLICATION FILED MAY 12, 1910.

1,015,681.

Patented Jan. 23, 1912.
23 SHEETS—SHEET 13.

Witnesses:
E. A. Volk
C. H. Bund.

Inventor.
William C. Huebner,
by Wilhelm, Parker & Hard,
Attorneys.

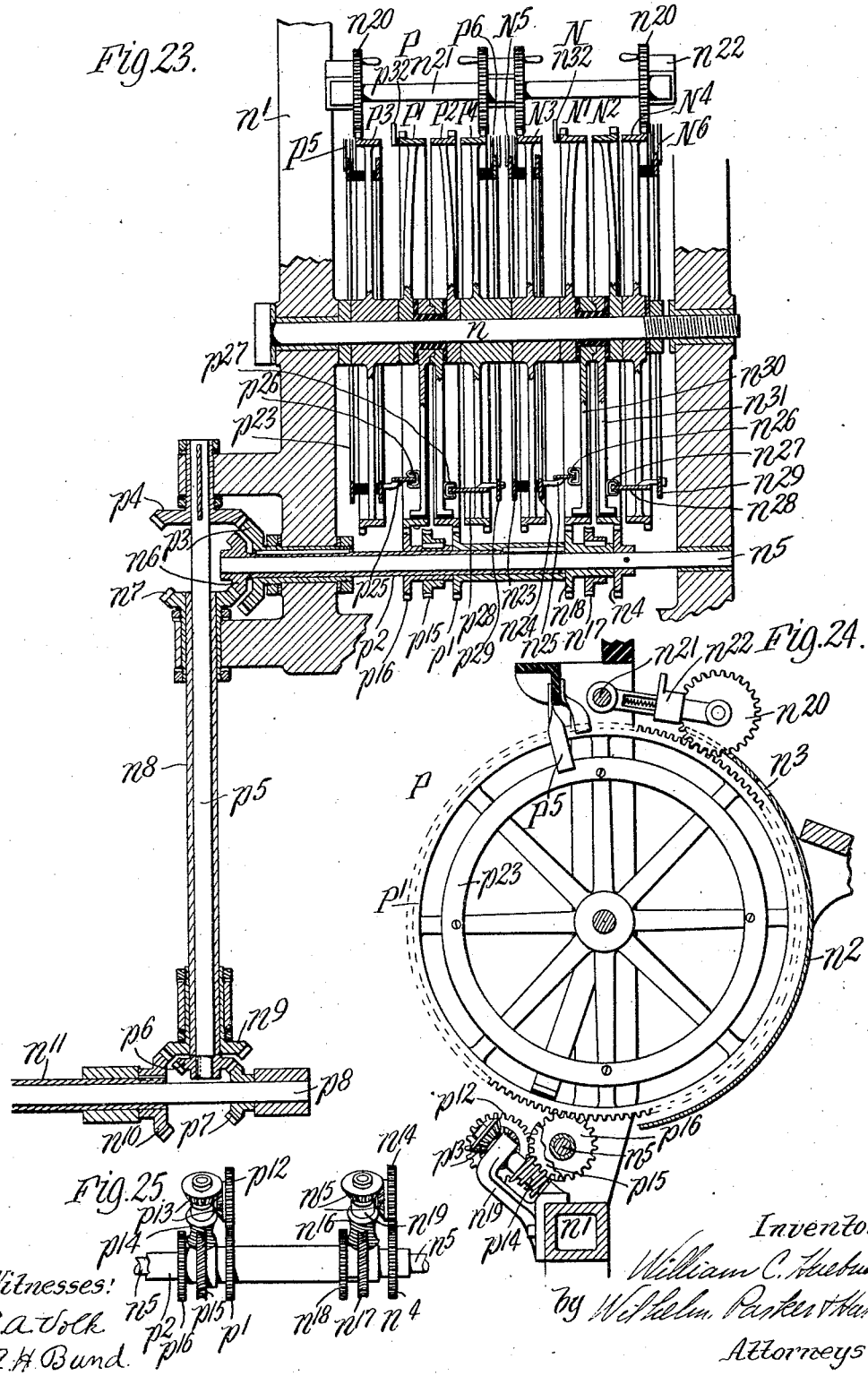

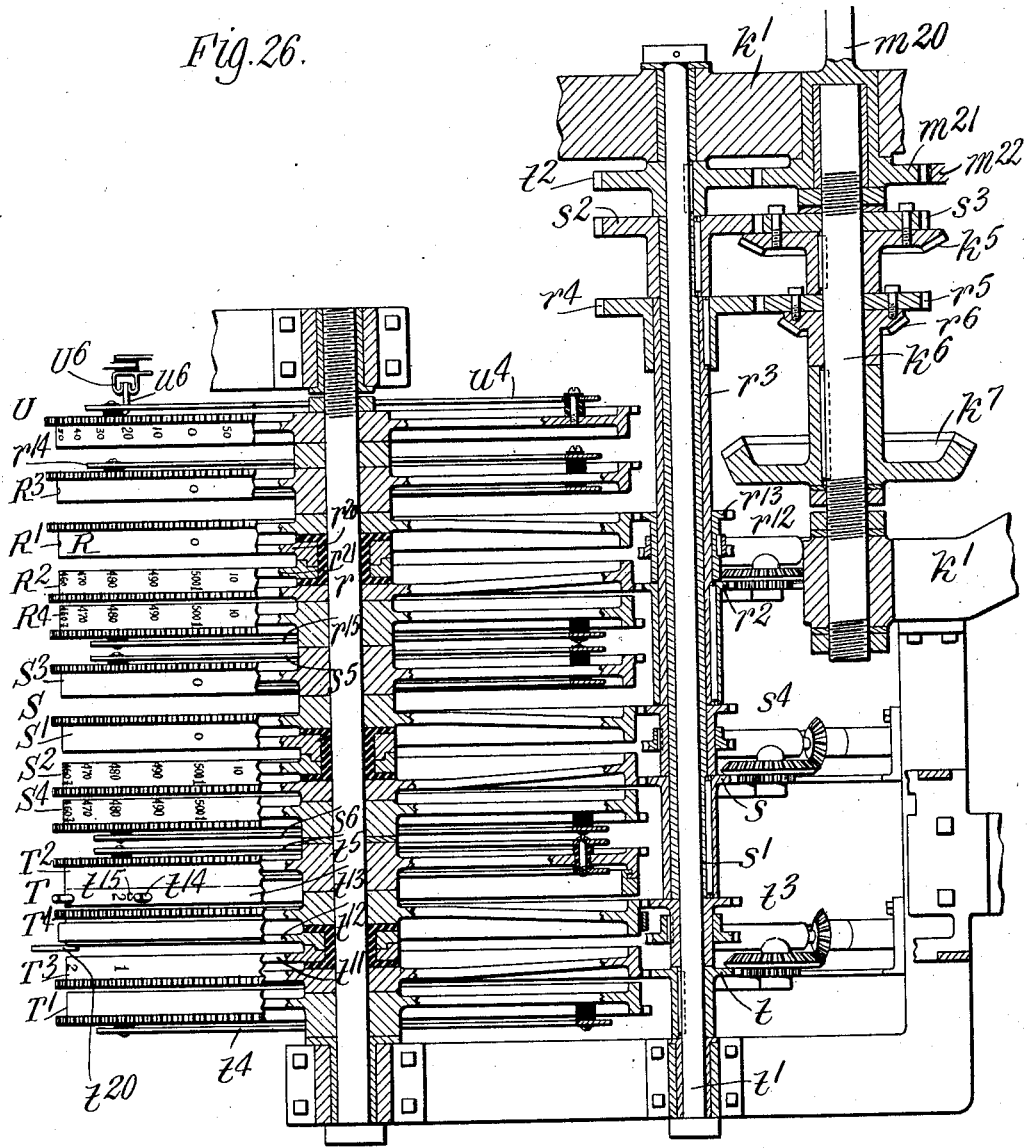

W. C. HUEBNER.
PHOTOGRAPHIC PRINTING MACHINE.
APPLICATION FILED MAY 12, 1910.

1,015,681.

Patented Jan. 23, 1912.
23 SHEETS—SHEET 16.

Witnesses:
E. A. Volk.
C. H. Bund.

Inventor
William C. Huebner,
by Wilhelm, Parker & Hurd,
Attorneys.

W. C. HUEBNER.
PHOTOGRAPHIC PRINTING MACHINE.
APPLICATION FILED MAY 12, 1910.
1,015,681.  Patented Jan. 23, 1912.
23 SHEETS—SHEET 17.
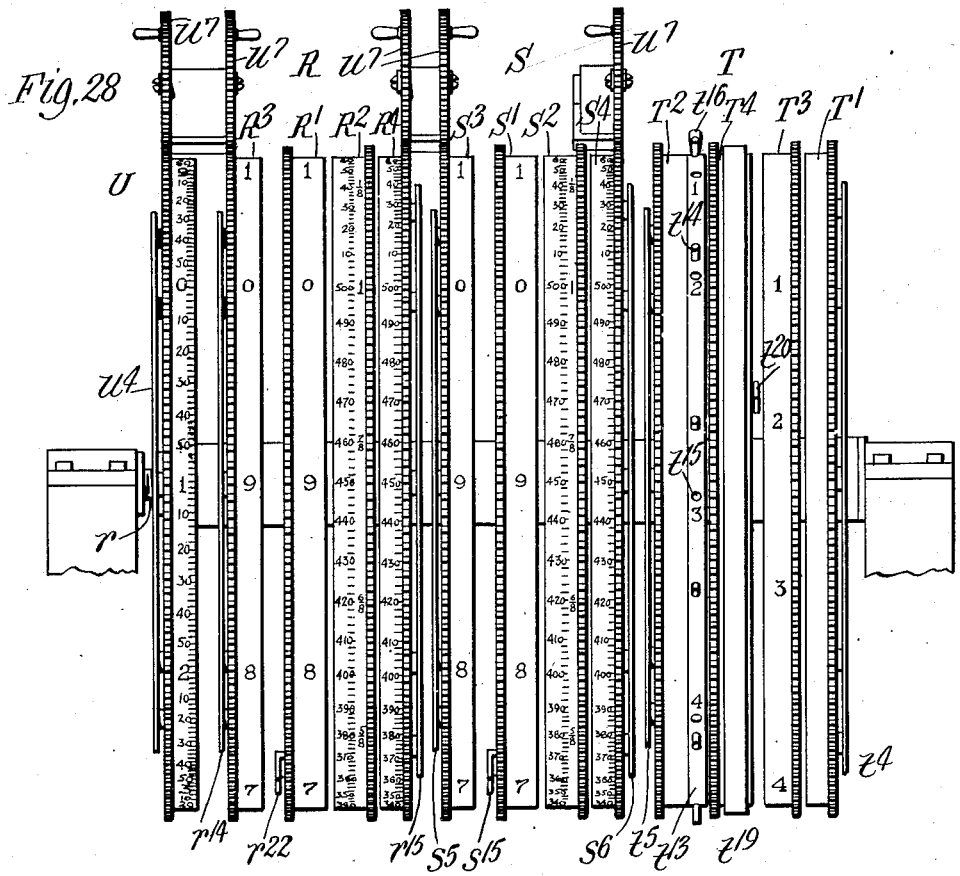
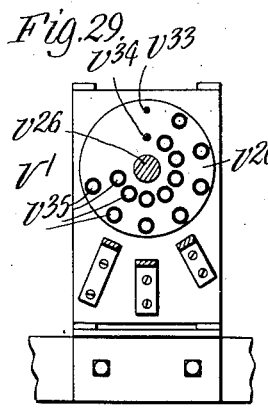
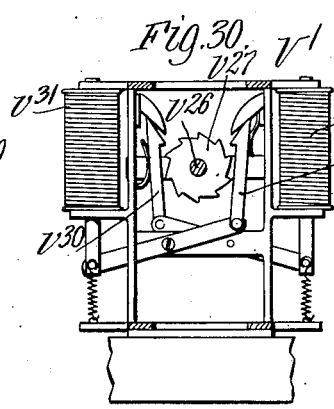
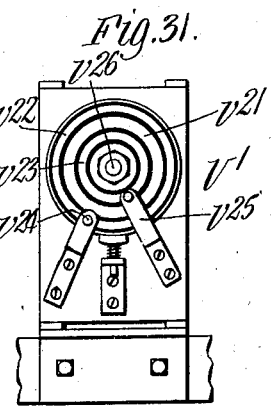
Witnesses:
E. A. Volk
C. H. Bund
Inventor.
William C. Huebner,
by Wilhelm, Parker & Hard,
Attorneys.

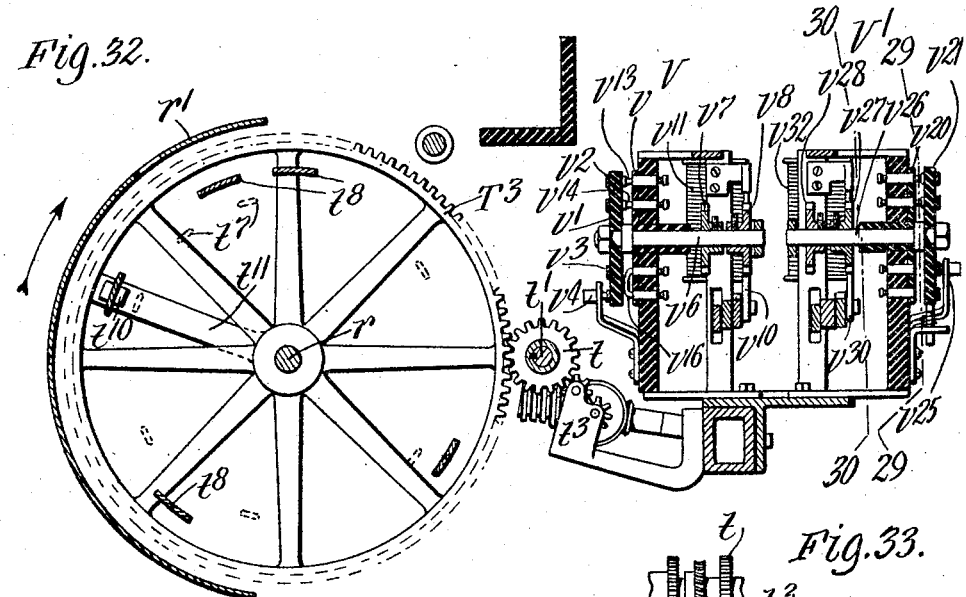
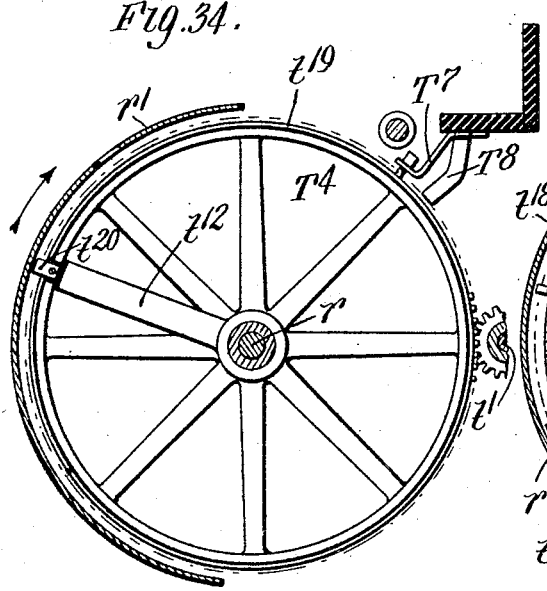
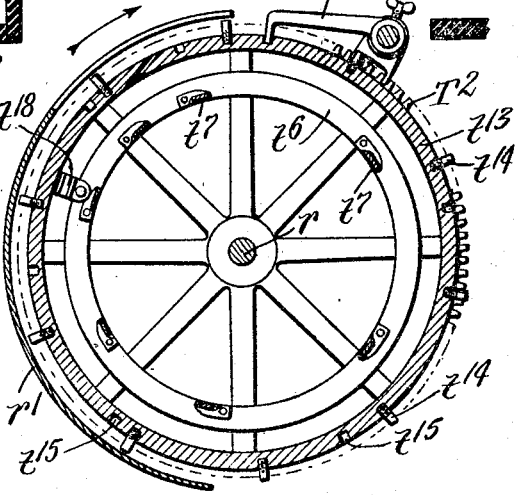

W. C. HUEBNER.
PHOTOGRAPHIC PRINTING MACHINE.
APPLICATION FILED MAY 12, 1910.

1,015,681.

Patented Jan. 23, 1912.
23 SHEETS—SHEET 19.

Witnesses:
E. A. Volk
C. H. Bund

Inventor
William C. Huebner,
by Wilhelm Parker & Hurd,
Attorneys.

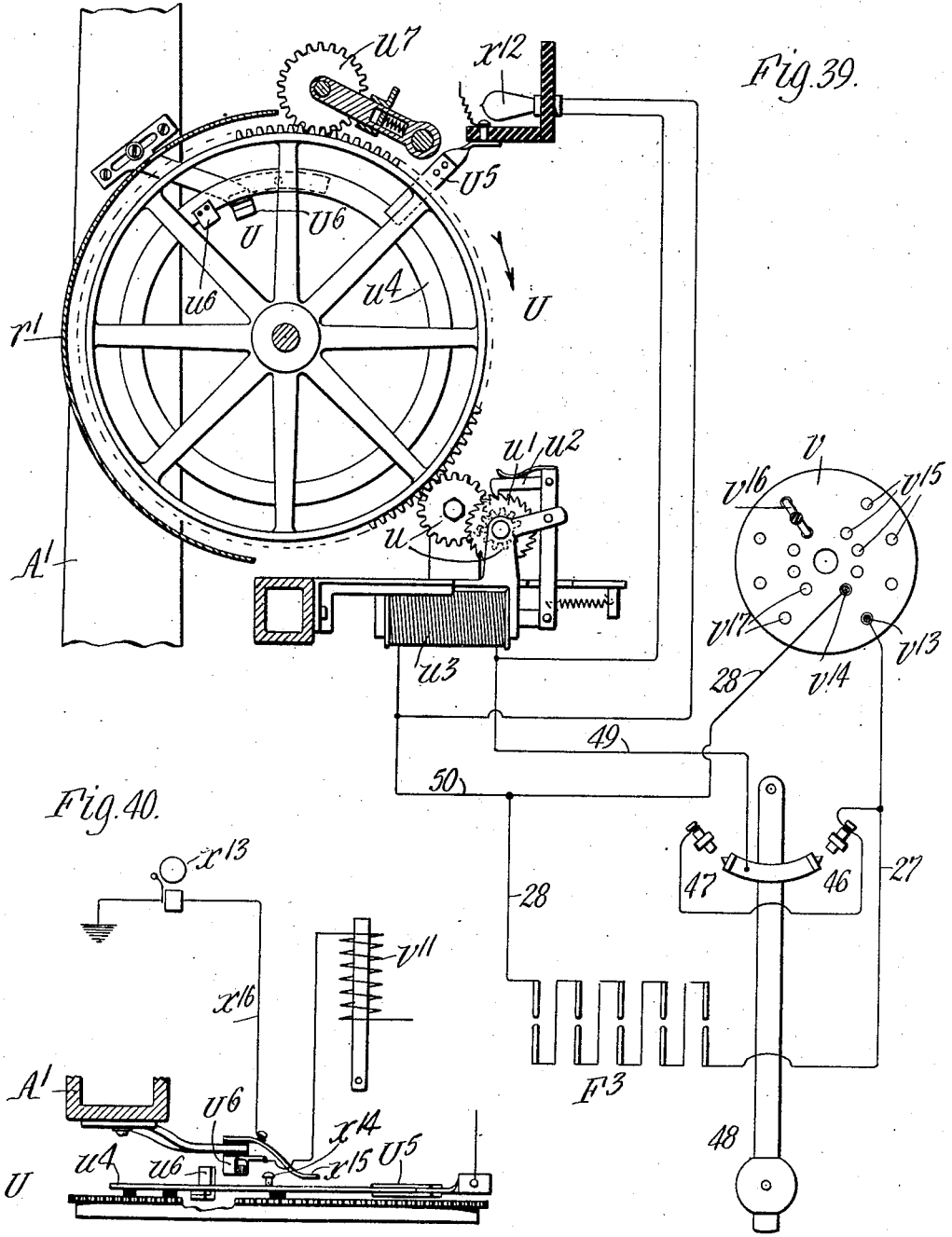

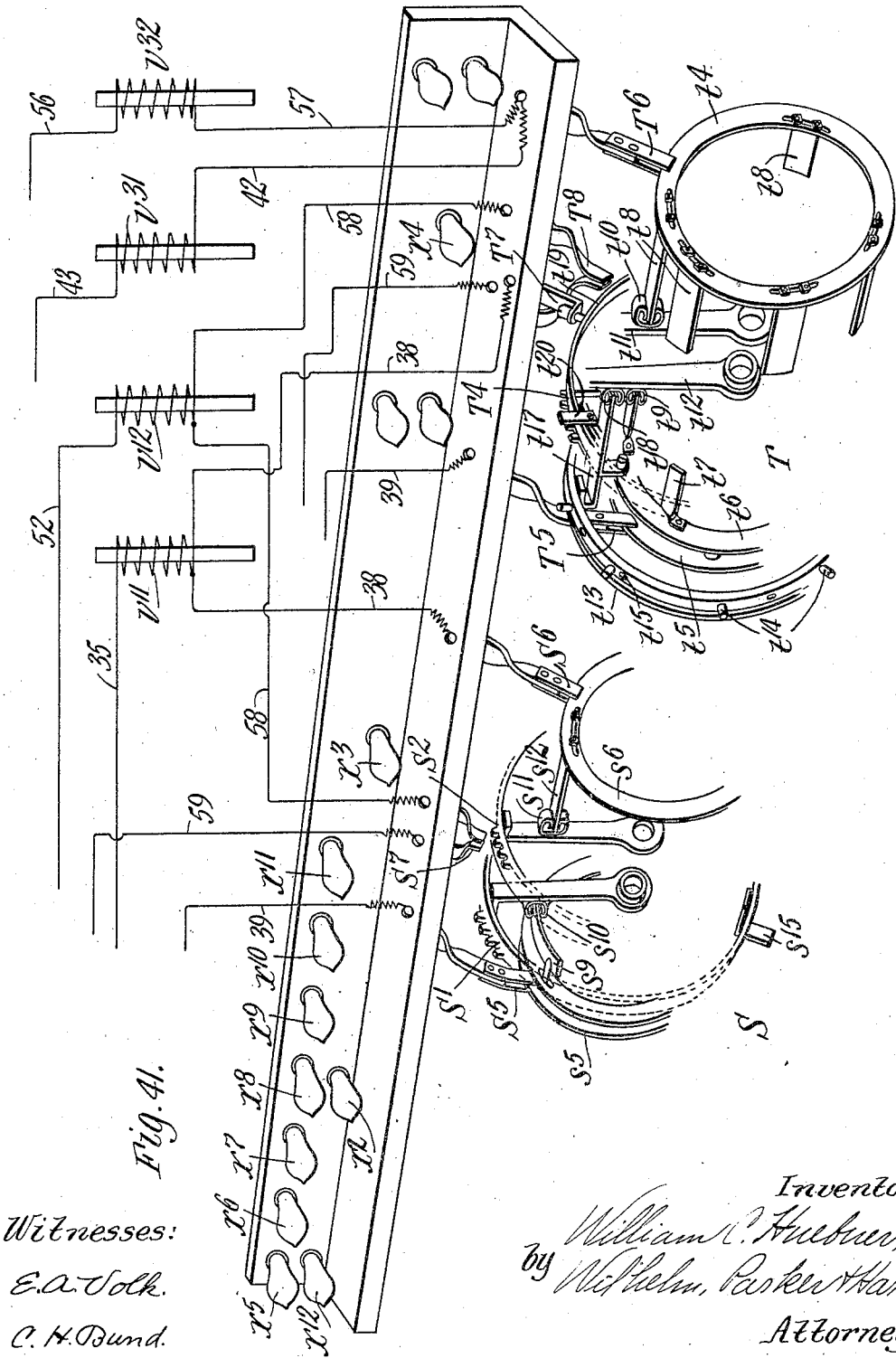

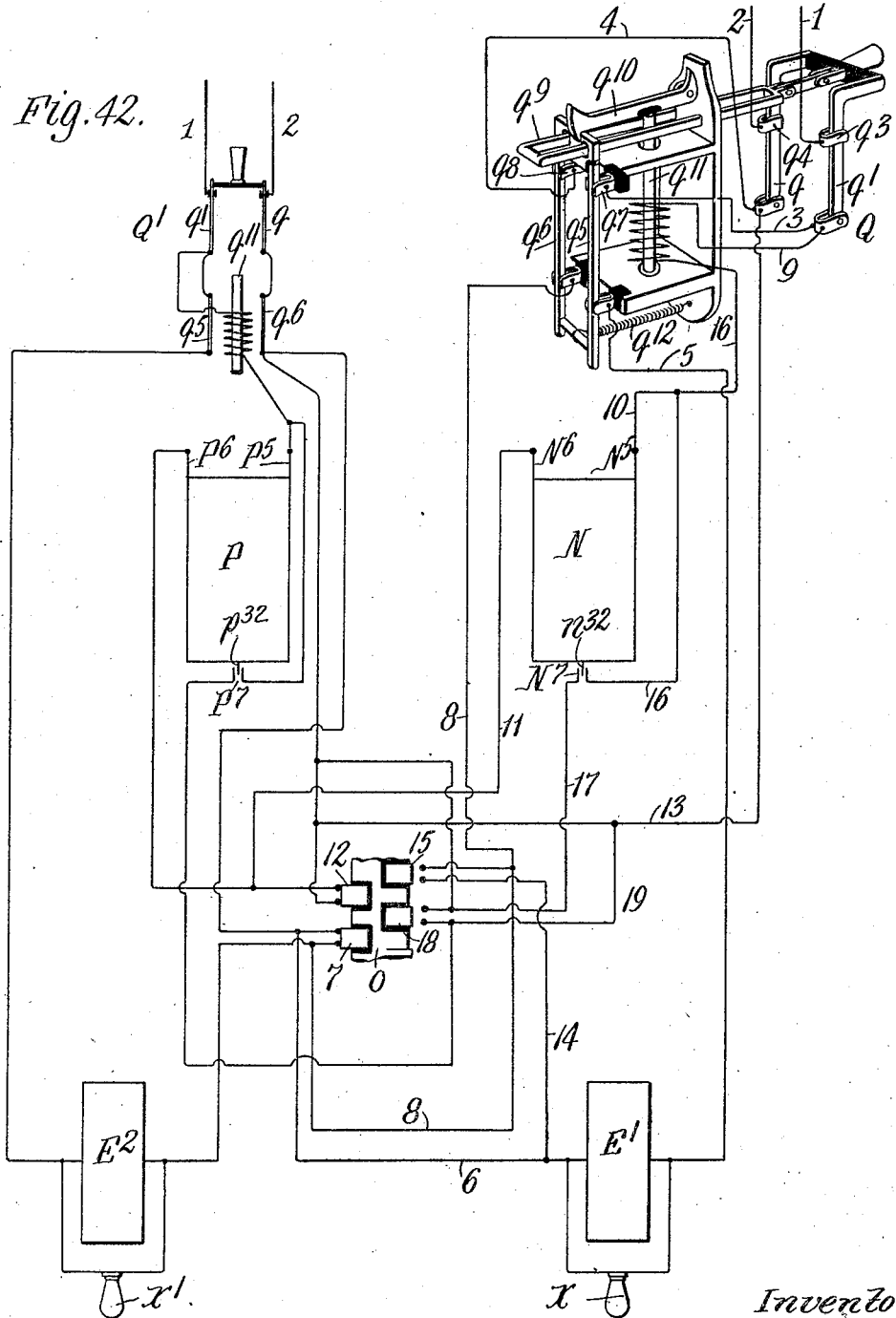

UNITED STATES PATENT OFFICE.

WILLIAM C. HUEBNER, OF BUFFALO, NEW YORK, ASSIGNOR OF ONE-HALF TO GEORGE BLEISTEIN, OF BUFFALO, NEW YORK.

PHOTOGRAPHIC-PRINTING MACHINE.

1,015,681. Specification of Letters Patent. Patented Jan. 23, 1912.

Application filed May 12, 1910. Serial No. 560,968.

*To all whom it may concern:*

Be it known that I, WILLIAM C. HUEBNER, a citizen of the United States, residing at Buffalo, in the county of Erie and State of New York, have invented a new and useful Improvement in Photographic-Printing Machines, of which the following is a specification.

This invention relates to an apparatus for producing photographic prints upon the sensitized surfaces of plates of metal or other material, or lithographic stones, which are afterward finished in any suitable manner and used for printing in one or more colors. Apparatus of this nature are disclosed in Patents Nos. 954,291 and 954,292, granted to myself and George Bleistein, April 5, 1910, which are intended for producing photographically a plurality of prints upon a single plate or stone which is afterward used for printing a plurality of impressions simultaneously so that a large edition can be printed in a short time, or for producing several multicolored pictures or designs upon the same sheet, in which case the several printing surfaces on the same plate or stone produce, in a single impression, all of the pictures or designs in the same color. The patented apparatus comprises a light chamber on which a transparent negative or positive printing plate is mounted for producing the photographic print upon the sensitized plate or stone, a back support or pressure device which bears against the rear side of the plate or stone opposite the light chamber for holding the plate or stone in close and uniform contact with the printing plate, and a plate holder which supports the sensitized plate or stone between the light chamber and pressure device. The light chamber and pressure device are movable toward and from the sensitized plate or stone into and out of contact therewith. The holder for the plate or stone and the light chamber are adjustable relative to each other transversely to the direction of the axis of the light chamber, in such manner that any portion of the sensitized surface upon which a print is to be made can be placed opposite to the printing plate. The light chamber, pressure device and holder for the plate or stone are moved or adjusted by hand actuated mechanisms.

The primary object of this invention is to produce a photographic printing machine of this nature by which perfect prints can be produced in predetermined locations upon sensitized surfaces with great accuracy and rapidity, and in which the holder for the sensitized plate or stone is adjusted and the light chamber and the pressure device are moved to and from the sensitized plate or stone by power driven mechanisms which are controlled by suitable controlling means or devices which can be actuated quickly and with little exertion.

Among other objects of the invention are the following: to provide the apparatus with adjustable micrometer controlling devices for the plate holder, light chamber and pressure device which can be readily set to determine the positions of adjustment for these devices, and which act automatically after the power driven adjusting mechanisms for the several devices have been set in operation to move their respective devices, to stop the power driven mechanism and arrest the several devices when they reach the exact predetermined positions; also to provide mechanism which is operated automatically, after it has been set in operation by the actuation of a suitable starting means, to first adjust the light chamber and the pressure device into proper contact with the printing plate or stone, then light the lamps, and then extinguish the lamps after the sensitized surface has been exposed for the required predetermined period of time, and after the actuation of suitable reversing means, to restore the parts to the initial position, ready for the adjustment of the sensitized plate or stone to the required position for the next print; also to provide a pressure device comprising a plurality of independently movable pressure rings or sections which are automatically moved to apply pressure to the sensitized plate or stone one after another in such a manner as to insure a perfect and uniform contact of the sensitized surface with all portions of the surface of the printing plate; also to provide adjustable controlling means by which any number, one or more, of the pressure rings or sections can be utilized, as required, depending upon the size of the printing plate being used; also to provide mechanism for moving or circulating the lamps in the light chamber in such a way as to uniformly distribute the light over the whole surface of the printing plate: and also to improve photographic printing machines of the character mentioned in the respects hereinafter described and set forth in the claims.

Briefly stated, the machine is organized and operates in the following manner: The holder for the sensitized plate or stone stands vertically and is movable in both a horizontal and a vertical direction in a vertical plane between the light chamber and the pressure device. The light chamber and the pressure device are movable horizontally toward and from the opposite sides of the plate or stone, and the pressure device comprises a series of pressure rings or sections which are separately and successively moved inwardly after the pressure device as a whole has been moved into proximity to the plate or stone, so as to insure a more perfect and uniform contact of the sensitized surface with the printing plate, and are again retracted in succession before the pressure device as a whole is moved away from the plate or stone. The plate holder is adjusted horizontally by mechanism driven by an electric clutch, and vertically by mechanism driven by a separate electrical clutch. The driving members of these clutches are geared to and driven by a main driving motor for the machine, and the clutches are controlled by separate adjustable micrometer controllers, which are adapted to be set to determine the required adjustments of the plate holder both horizontally and vertically. After the controllers are set, a switch is actuated to energize the clutch of one adjusting mechanism, for instance the horizontal adjusting mechanism, and this mechanism moves the plate holder horizontally until the plate reaches the predetermined horizontal adjustment, when this clutch is automatically cut out by its controller and the horizontal adjusting mechanism is stopped. Another switch is then actuated to energize the clutch of the vertical adjusting mechanism and this mechanism moves the plate holder vertically until the plate reaches the predetermined vertical adjustment, when this clutch is similarly cut out by its controller and the plate holder is arrested with the plate in the required position. The light chamber and the pressure device are moved by mechanisms driven by separate electrical clutches, and each of these clutches is controlled in a similar manner by a separate adjustable micrometer controller. Only as many of the pressure rings are operated as are required to apply pressure to the whole surface of the printing plate, a greater or less number of rings being operated, depending upon the size of the printing plate being used. The pressure rings are actuated by separate electrical clutches controlled by a controller which can be set to cause the operation of any required number of the pressure rings.

The light for printing is produced by electric lamps, and the length of the exposure to the light is governed by a time mechanism including a controller which can be set so that the light will be maintained for any required length of time. After the plate holder has been adjusted as described and the several controllers for the light chamber, pressure device, pressure rings and time mechanism have been set as required for the particular work being produced, a starting switch is actuated which causes the light chamber to be first moved inwardly to place the printing plate against the sensitized surface of the plate or stone and its driving clutch is automatically thrown out of action and the operating mechanism for the pressure device set in action by the controller for the light chamber, and the pressure device is moved inwardly to the proper position. The controller for the pressure device then operates to throw out of action the driving clutch for the pressure device and set in motion the mechanism which moves the pressure rings successively inwardly against the plate or stone. When the predetermined number of pressure rings have been operated the controller therefor throws the ring operating mechanism out of action, lights the electric lamps and puts in action the time mechanism which maintains the lights for the predetermined period of time, after which the lights are automatically extinguished. The operator then sets the time controller for the next exposure, reverses the motor and actuates the starting switch, and the mechanisms operate automatically in a reverse order to retract the pressure rings, then move the pressure device as a whole away from the plate or stone, and then retract the light chamber, after which the apparatus comes to rest in position ready for the plate to be adjusted and the several devices again operated in the manner described for producing another print in a new position on the sensitized surface.

Figure 21:
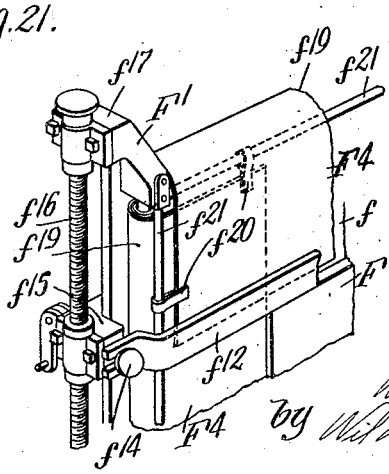
Figure 22:
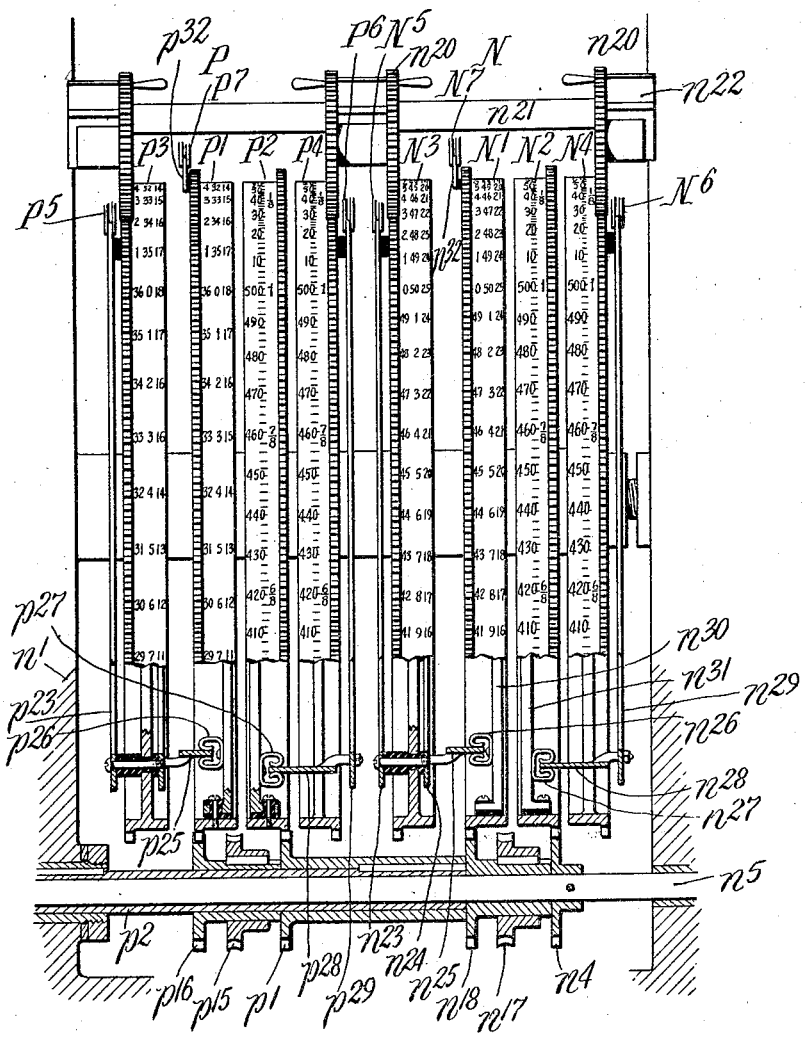
Figure 27:
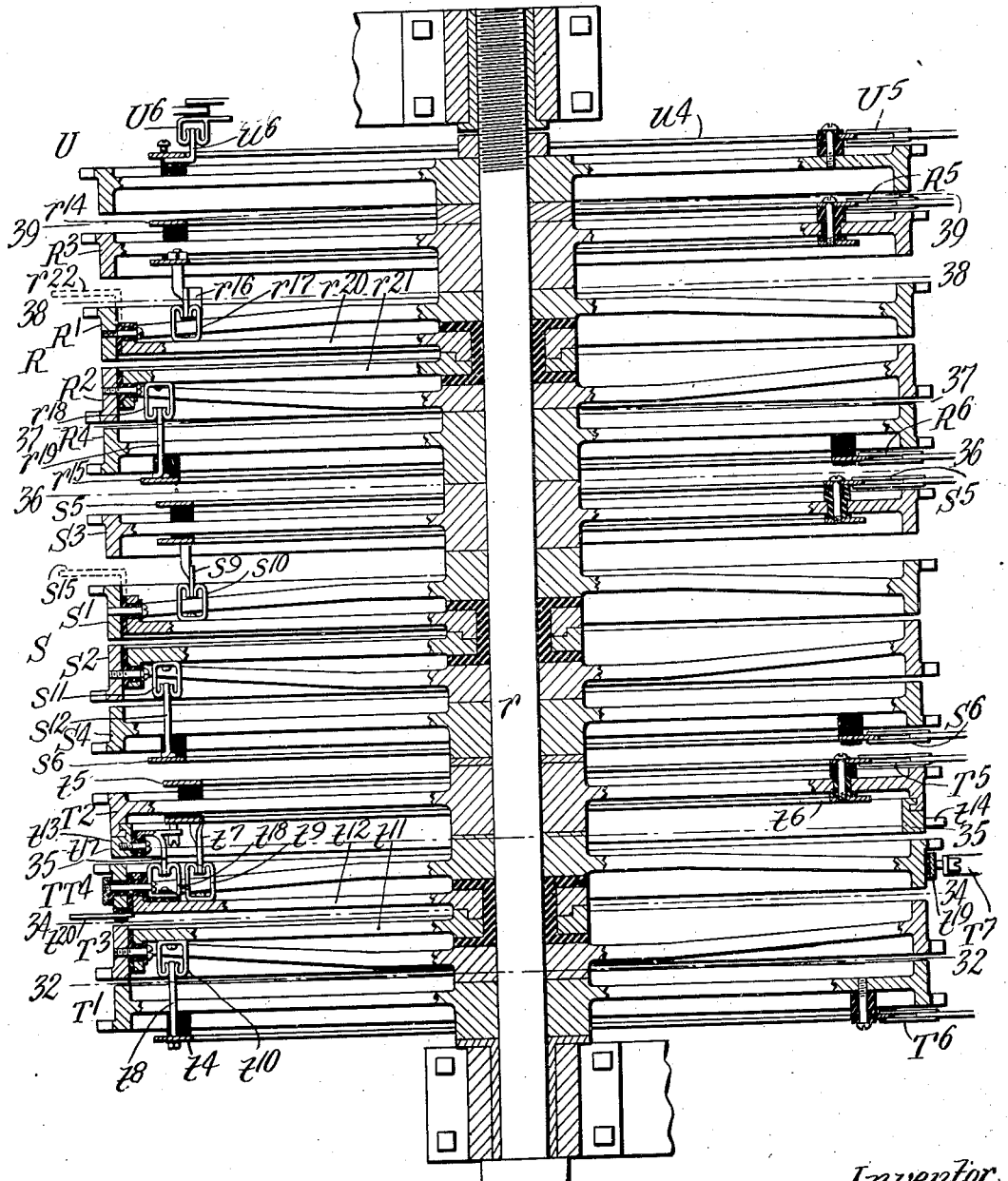
Figure 36:
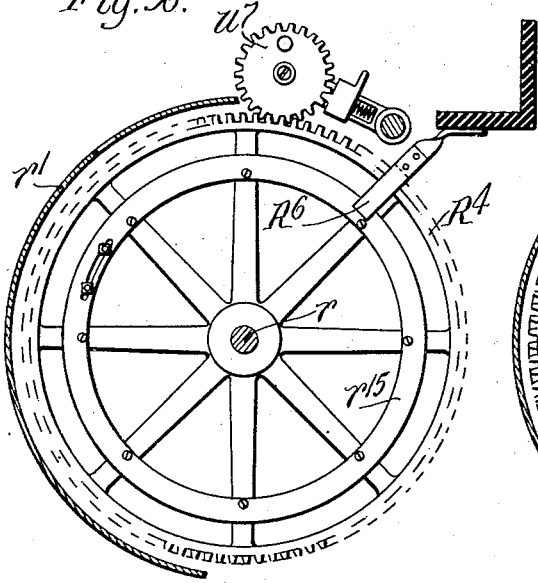
Figure 37:
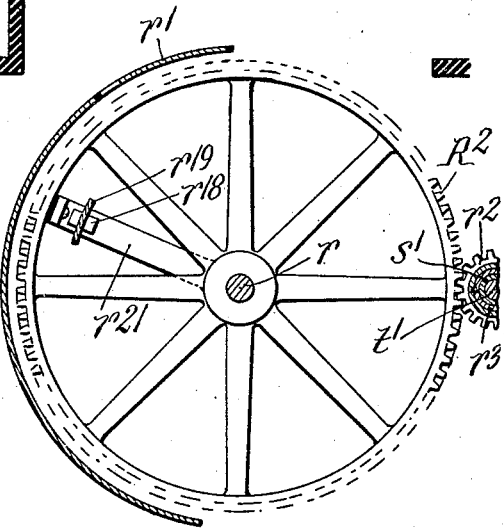
Figure 38:
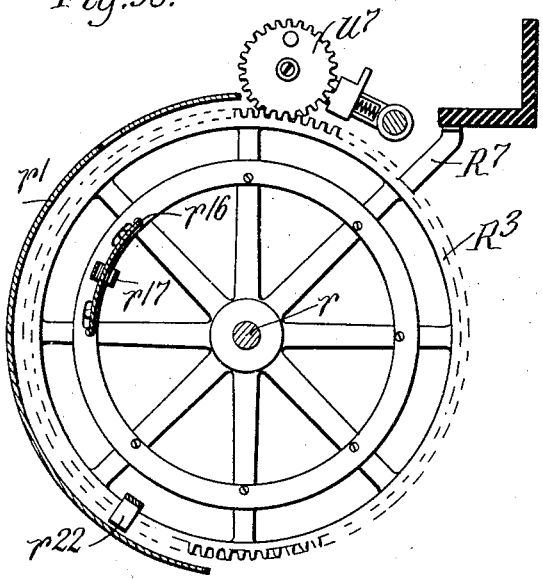
Figure 43:
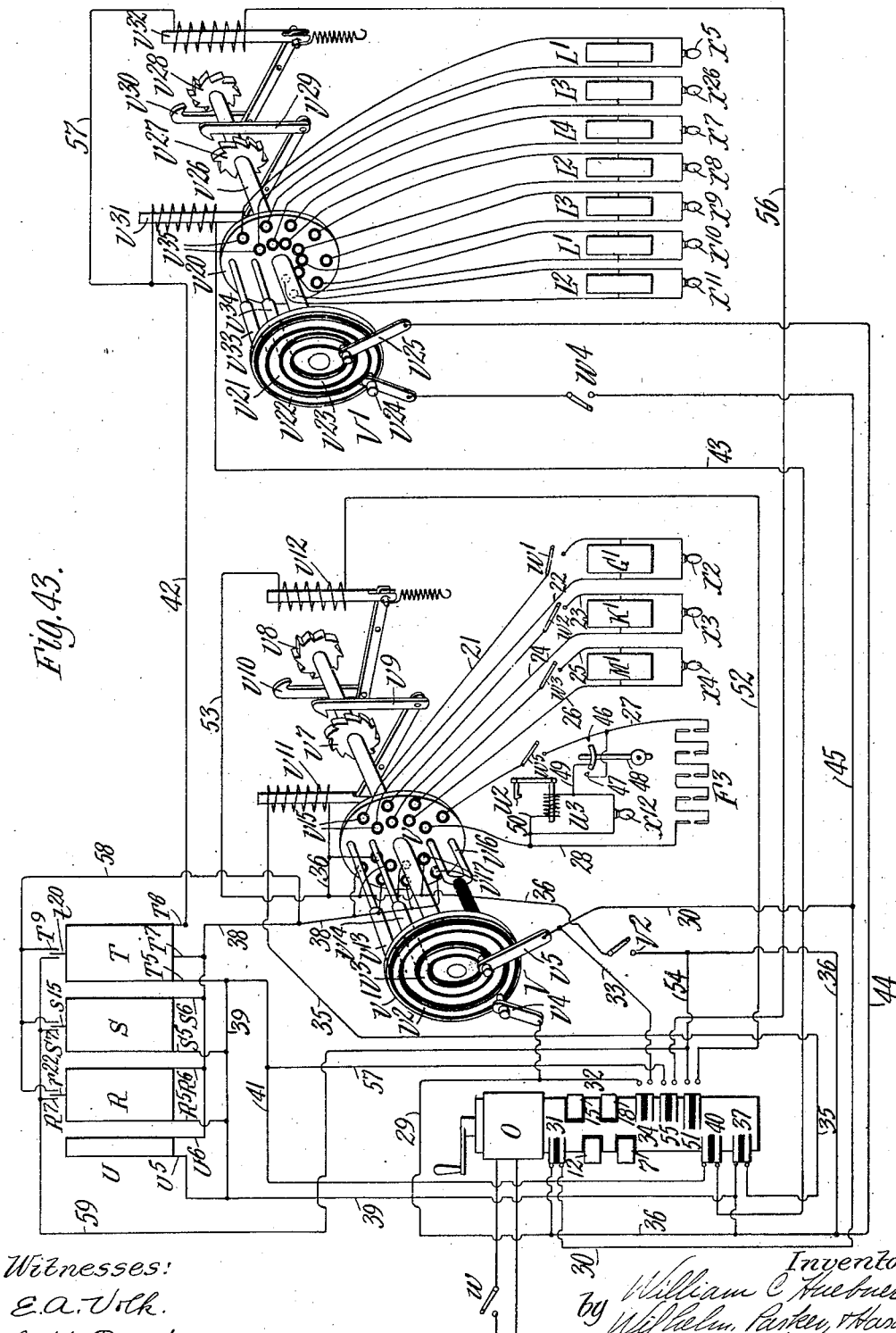

In the accompanying drawings, consisting of twenty-three sheets: Figure 1 is a front elevation of a photographic printing machine embodying the invention. Fig. 2 is a sectional plan thereof in line 2—2, Fig. 1. Fig. 3 is an enlarged sectional elevation of one of the electrical clutches of the adjusting mechanism for the plate holder. Fig. 4 is an enlarged sectional elevation in line 4—4, Fig. 2, showing a portion of the gearing of the adjusting mechanism for the plate holder. Fig. 5 is an enlarged end elevation, partly in section, of the machine. Fig. 6 is an enlarged transverse central sectional elevation of the machine. Fig. 7 is a longitudinal sectional elevation of the machine. Fig. 8 is a longitudinal sectional elevation of the base portion of the machine, in line 8—8, Fig. 5. Fig. 9 is an enlarged horizontal section, partly in plan, of the light chamber, pressure device and associated parts. Fig. 10 is an enlarged rear elevation, partly in section, of the light chamber and its operating mechanism. Fig. 11 is a fragmentary perspective view of the lamp circulating mechanism. Fig. 12 is a central sectional elevation, on an enlarged scale, of the pressure device and its operating mechanism. Fig. 13 is a front elevation, partly in section, of the pressure device. Fig. 14 is a detail section of the pressure device in line 14—14, Fig. 13. Fig. 15 is an enlarged sectional elevation of the pressure device in line 15—15, Fig. 13. Fig. 16 is a distorted plan view, partly in section, on an enlarged scale, of a portion of the drive mechanism of the machine. Fig. 17 is an enlarged rear elevation of the plate holder and associated parts. Fig. 18 is an elevation, partly in section, in line 18—18, Fig. 12, of the operating gearing for the pressure rings. Fig. 19 is a fragmentary plan view of the gearing shown in Fig. 18. Fig. 20 is an enlarged front elevation, partly in section, of the light chamber. Fig. 21 is an enlarged fragmentary perspective view of the holder for the printing plate and the screens for the light chamber. Fig. 22 is an elevation, partly in section, on an enlarged scale, of the micrometer controllers for the plate holder adjusting mechanism. Fig. 23 is a sectional elevation of the micrometer controllers in line 23—23, Fig. 5. Fig. 24 is an end elevation, partly in section, of the micrometer controllers. Fig. 25 is a detail elevation of the reducing gearing connecting the driven wheels of the micrometer controllers. Fig. 26 is a horizontal section, partly in plan, of the micrometer controllers for the light chamber, pressure device, pressure rings and time mechanism. Fig. 27 is an enlarged sectional elevation of the controllers shown in Fig. 26. Fig. 28 is an elevation of the controllers shown in Figs. 26 and 27. Figs. 29 and 30 are sectional elevations in lines 29—29 and 30—30, respectively, Fig. 32, of the automatic circuit-changing switch. Fig. 31 is an end elevation of the circuit-changing switch. Fig. 32 is a fragmentary sectional elevation, on a reduced scale, of the pressure ring controller in line 32—32, Fig. 27. Fig. 33 is an elevation of the reducing gearing shown in Fig. 32. Figs. 34, 35, 36, 37 and 38 are reduced sectional elevations of the micrometer controller in lines 34—34, 35—35, 36—36, 37—37 and 38—38, respectively, Fig. 27. Fig. 39 is a reduced sectional elevation in line 39—39, Fig. 27, and a diagrammatic view of the time mechanism. Fig. 40 is a fragmentary plan view thereof. Fig. 41 is a fragmentary distorted perspective view of the controllers for the pressure device and pressure rings. Fig. 42 is a diagrammatic view, partly in perspective, of the controlling switch and electrical connections for the adjusting mechanism of the plate holder. Fig. 43 is a diagrammatic view of the electrical connections for the controlling means for the light chamber, pressure device, pressure rings and time mechanism.

Like reference characters refer to like parts of the several figures.

The stationary main frame of the machine may be of any suitable construction. The frame shown in the drawings comprises, an upright rectangular central portion A in which the plate holder is mounted to move horizontally and vertically, an upright front portion A', which supports the pressure device, and an upright rear portion $A^2$ which supports the light chamber. The upright central portion of the frame consists of a horizontal rectangular base $a$, a horizontal rectangular top frame $a'$, and upright corner posts $a^2$ connecting the four corners of the base and top frame.

*Plate holder and its adjusting mechanism.*—The holder for the sensitized plate B, see Figs. 1, 6, 7 and 17, consists of an open rectangular frame B' adapted to support the sensitized plate in upright position. This frame may be of any suitable construction and may be provided with any suitable means for securing a plate, stone, or other material having a sensitized surface therein. The holder B shown in the drawings is provided with means for holding a thin sensitized plate or sheet and is hereinafter called a "plate holder" for the sake of brevity, but it will be understood that the holder can be used for holding a lithographic stone, or can be replaced by another holder especially adapted for holding a stone. The plate holder shown is provided at the top and bottom thereof with clamps adapted to grip and hold the upper and lower edges of the sensitized plate. Each of these clamps comprises a stationary bar $b$ and a hinged bar $b'$ between which the edge of the sensitized plate is gripped. The hinged bar is forced toward the stationary bar to grip the plate by a screw shaft $b^2$ journaled on the stationary bar $b$ provided with conical enlargements $b^3$ which bear against wedge faces $b^4$ on the hinged clamping bar.

$b^5$ represents vertical screw shafts which are journaled and held from endwise movement in bearings $b^6$ on the opposite ends of the plate holder frame B' and have oppositely threaded portions working in internally threaded sleeves $b^7$ on the opposite ends of the two clamp bars $b$, so that the rotation of the shafts will move the clamps simultaneously toward or away from each other to loosen or tighten the sensitized plate in the plate holder. The lower ends of the screw shafts $b^5$ are connected by beveled gear wheels $b^8$ to the opposite ends of a shaft $b^9$ which is journaled in bearings on the bottom of the plate holder and is connected by a beveled gear wheel $b^{10}$ to a beveled gear wheel $b^{11}$, Fig. 6, which is journaled on the bottom bar of the plate holder and is fashioned to receive an operating crank for turning it. By turning this crank in one direction or the other the screw shafts $b^5$ are rotated so as to move the upper and lower clamps for the sensitized plate toward or from each other for releasing and tightening the plate.

The plate holder B' is mounted so that it can be adjusted vertically and horizontally in a vertical plane, for which purpose, in the construction shown, it is movable vertically in a carriage C which in turn is movable horizontally in the upright central portion A of the main frame. The carriage C shown consists of a frame formed by horizontal top and bottom bars connected by upright side rods $c$. The plate holder B' is provided at opposite ends with guide bearings $c'$ which slide vertically on the side rods $c$ of the carriage. The carriage C rests at its lower end on and is adapted to slide horizontally on a horizontal track $c^2$ on the base of the central portion A of the main frame, and the upper end of the carriage is provided with bearings $c^3$ which surround and are adapted to slide on a horizontal guide rod $c^4$ at the top of the central portion A of the main frame. The track $c^2$ preferably has a guide groove or way in its upper surface which receives the correspondingly shaped lower edge of the bottom bar of the carriage C, and is adjusted vertically in a channel in the base of the main frame by screws $c^5$, Figs. 7 and 8, to take up wear and prevent looseness of the carriage in its guides.

$c^6$ represents two vertical screw shafts which are journaled at their opposite ends in bearings on the opposite ends of the carriage C. These screw shafts are held from longitudinal movement in their bearings and are provided with screw-threaded portions working in screw-threaded sleeves or nuts $c^7$ secured centrally to the opposite ends of the plate holder B'. The screw shafts $c^6$ are connected at their lower ends by beveled gear wheels $c^8$ to hollow shafts or sleeves $c^9$, see Figs. 8 and 16, which are journaled and held from endwise movement in suitable bearings on the lower bar of the carriage C and are splined on a horizontal operating shaft C', Figs. 2, 8 and 16, which is journaled in the base portion of the main frame. The rotation of this shaft C' in one direction or the other will turn the screw shafts $c^6$ and move the plate holder B' upwardly or downwardly in the carriage C. The sleeves $c^9$ are adapted to slide along the shaft C' when the carriage is moved horizontally and turn with the shaft C' when the latter is rotated so as to permit the vertical adjustment of the plate holder B' in the carriage C in any horizontal adjustment of the carriage. The operating shaft C' is driven as hereinafter explained.

D and D' represent upper and lower horizontal screw shafts for adjusting the carriage C horizontally. The upper screw shaft is journaled at its opposite ends in suitable bearings at the ends of the top of the central portion A of the main frame, and the lower shaft D' is similarly journaled in bearings at the opposite ends of the base of the main frame and is also preferably supported between its ends in bearings $d$ on the base of the frame. The upper and lower screw shafts D D' are connected to turn together by a shaft $d'$ which is suitably journaled in bearings at one end of the central portion A of the main frame and is geared by bevel wheels $d^2$ and $d^3$ at its ends to the screw shafts D and D'. The upper and lower screw shafts have threaded portions working in screw-threaded nuts $d^4$ and $d^5$ which are secured respectively to the central portions of the upper and lower ends of the carriage C. By turning the lower screw shaft D' in one direction or the other, the plate holder carriage is moved horizontally in its guide tracks in one direction or the other.

The following mechanism is shown for driving the operating shaft C' and the screw shaft D', see Figs. 2, 7 and 16: E represents a main drive shaft which extends horizontally at one end of the machine and is provided with a pulley $e$ which is belted to a reversible electric motor (not shown). The main drive shaft is geared by a wheel $e'$ to the loose or driving member of an electric clutch E', and by a gearing wheel $e^2$ to the driving member of an electric clutch E². The other or driven member of the clutch E' is fixed to a shaft $e^3$ which is geared by bevel gear wheels $e^4$ to the horizontal adjusting screw D' for the plate holder carriage, and the driven member of the other clutch E² is fixed to a shaft $e^5$ which is geared by bevel gear wheels to the operating shaft C' for the vertical adjusting screws of the plate holder. The driving member of each of the clutches E' and E², which is geared to the main drive shaft E, runs freely and is driven continuously in one direction or the other when the motor is in operation, depending upon the direction of rotation of the motor. The other member of each clutch and the adjusting screws to which it is connected remain stationary until the clutch is energized to cause the driven member to rotate with the driving member of the clutch. Electrical clutches of any suitable construction adapted to operate in this manner can be used. Separate controlling means are provided for each of the clutches. When it is desired to adjust the plate holder carriage horizontally the clutch E' is energized by the operation of its controlling means, and when the plate holder is to be adjusted vertically the other clutch E² is energized by the operation of its controlling means, in the manner hereinafter described.

This invention is not restricted to the described construction of the plate holder and the manner of mounting it for horizontal and vertical adjustment, nor to the described mechanism for producing these movements or adjustments of the plate holder, and the plate holder can be differently constructed and mounted, and other adjusting mechanism for the plate holder, which is operated and controlled as hereinafter described, can be employed.

*Light chamber.*—F represents the transparent negative or positive printing plate which is supported by the light chamber against the sensitized plate and through which the light produced by the lamps in the light chamber passes to produce the print on the sensitized surface. The light chamber shown comprises a front section F' provided with a transparent face plate $f$ on which the printing plate is secured, and a rear section F² which carries the lamps F³ and is movable toward and from the front section to place the lamps nearer to or farther from the printing plate. The sections F' and F² are furnished with telescoping shields $f'$ $f^2$, Fig. 6, to prevent the escape of light through the space between the sections. The front section F' is provided at its top and bottom with bearing sleeves $f^3$ which slide on horizontal guide rods $f^4$ secured in projecting brackets on the rear upright portion A² of the main frame. The adjustable rear section F² of the light chamber is provided at its bottom with supporting casters $f^5$ which roll on projecting arms $f^6$ of the rear portion of the main frame, and is connected to the front section F' by adjusting screws $f^7$, Figs. 5 and 9, journaled in bearings $f^8$ on the front section and passing through threaded nuts $f^9$ on the rear section F². The rear section can be adjusted toward or from the front section by turning these screws in one direction or the other. The rear section of the light chamber is also preferably provided with a removable back $f^{10}$ which is detachably secured to the rear section by pivoted clamping bolts $f^{11}$ or other suitable fastenings. This back is made removable to afford access to the lamps and their operating mechanism and to permit the lamps to be removed from the light chamber, as hereinafter described.

The printing plate F can be held in place on the transparent front plate of the light chamber by any suitable means. The means shown for this purpose, see Figs. 5, 9, 20 and 21, comprise upper and lower clamping bars $f^{12}$ and $f^{13}$ adapted to engage the upper and lower edges of the printing plate. Each of these bars is secured at its opposite ends by lever-operated securing bolts $f^{14}$, or other fastening means, to blocks $f^{15}$ which are adapted to slide vertically on lips at the opposite sides of the front section F' of the light chamber and have screw-threaded engagements with two vertical operating screws $f^{16}$ which are journaled and held from endwise movement in suitable bearings $f^{17}$ and $f^{18}$ on opposite sides of the front section of the light chamber. The operating screws $f^{16}$ for one clamping bar are disconnected from those for the other bar, so the bars can be moved independently to hold or release the printing plate. The clamping bars have elongated slots through which their securing bolts $f^{14}$ pass, which permit the bars to be moved to place the printing plate in an upright or slightly oblique position, as may be required.

F⁴ represents flexible shades or screens which are provided at the four edges of the front plate of the light chamber. Each of these screens is attached to a spring-operated roller $f^{19}$, like the ordinary shade roller, journaled on the adjacent side of the light chamber, and the screens are provided at their opposite edges with guide loops $f^{20}$ which slide on guide rods $f^{21}$ arranged at the four sides of the light chamber in front of the screen rollers. These shades or screens can be drawn inwardly to the edges of the printing plate to cover the portions of the front plate of the light chamber surrounding the printing plate to prevent the escape of the light from the printing chamber around the printing plate.

The light chamber is movable bodily horizontally toward and from the plate holder B' to place the printing plate in contact with the sensitized plate and to retract it therefrom by adjusting screws G, Figs. 5 and 10, at opposite sides of the light chamber. These adjusting screws are secured at their front ends to the front section of the light chamber and work in internally-threaded sleeves $g$ which are journaled to rotate but are held from endwise movement in suitable bearings $g'$ on the rear upright portion A² of the main frame, and are provided at their rear ends with bevel gear wheels $g^2$ meshing with bevel gear wheels $g^3$ on the upper end of two inclined shafts $g^4$, Figs. 5, 10 and 16. These shafts are journaled in suitable bearings on the rear upright portion A² of the main frame, and are connected at their lower ends by bevel gear wheels $g^5$ to a horizontal shaft $g^6$ which is journaled on the base of the main frame and is connected by a train of gear wheels $g^7$, Figs. 10 and 16, to the loose or driven member of an electric clutch G', the other or driving member of which is secured to a horizontal shaft $g^8$ which is connected by bevel gear wheels $g^9$ to the main drive shaft E. When the motor is in operation the shaft $g^8$ and the driving member of the clutch G' secured thereto are driven continuously in one direction or the other, depending upon the direction of rotation of the motor. The other member of the clutch is normally stationary and is caused to rotate with the driving member of the clutch by the controlling means for the clutch hereinafter described.

*Lamp circulating mechanism.*—The electric lamps $F^3$, of which any suitable number may be used, can be mounted in any convenient manner in the light chamber, but they are preferably mounted so that they can be circulated to thereby more uniformly distribute the light over the surface of the printing plate. In the construction shown, see Figs. 6, 9 and 11, the lamps are carried by arms projecting from a rectangular frame $h$, which is provided at its upper and lower ends with bearing sleeves $h'$ which surround and are adapted to slide horizontally on the upper and lower horizontal bars of a rectangular frame $h^2$ which has vertical tubular end bars by which it is mounted and adapted to slide vertically on the upright end bars of a rectangular frame $h^3$. This rectangular frame $h^3$ is preferably hinged at one side by pivot screws $h^4$, or other pivot connections, so that the frame with the lamps supported thereby can be swung out of the light chamber when the back $f^{10}$ thereof is removed to afford access to the lamps and to the chamber. The frame $h^3$ is normally held stationary in the light chamber by a securing screw $h^5$, Fig. 10, or other means.

$h^6$ represents a crank provided with an adjustable wrist pin which is connected by a pitman $h^7$ to the horizontally moving lamp frame $h$ and by a pitman $h^8$ to the vertically moving frame $h^2$. When this crank is rotated it simultaneously reciprocates one frame vertically and the other horizontally, thereby causing the several lamps to circulate in circular orbits. The crank can be rotated to circulate the lamps by any suitable means whether driven by the main motor for the machine or otherwise. In the construction shown, the crank $h^6$ is secured to a gear wheel $h^9$ which is journaled on a swinging arm $h^{10}$ and is adapted to mesh with a long pinion $h^{11}$ on a shaft $h^{12}$ which is journaled in bearings on the rear upright portion $A^2$ of the main frame. This shaft $h^{12}$ is connected by bevel gear wheels $h^{13}$ to a vertical shaft $h^{14}$ which is journaled in bearings on the rear portion $A^2$ of the main frame and is connected by bevel gear wheels $h^{15}$ to the operating clutch shaft $g^8$ for the light chamber. The swinging arm $h^{10}$ carrying the operating crank $h^6$ for the lamps is pivoted at its upper end on the lamp-supporting frame $h^3$ so that it can swing to move the gear wheel $h^9$ into and out of mesh with the long pinion $h^{11}$. The lower end of the swinging arm $h^{10}$ is connected to the rod of a piston which is movable in a cylinder $h^{16}$. This cylinder is secured on a bracket projecting from the lamp-supporting frame $h^3$ and is connected by a pipe $h^{17}$ to a reservoir $h^{18}$ containing compressed air. The air pipe $h^{17}$ is furnished with a valve $h^{19}$, Figs. 1 and 5, located at a suitable point at the front of the machine by which air can be admitted to and discharged from the cylinder $h^{16}$ for operating its piston to move the gear wheel $h^9$ into mesh with the pinion $h^{11}$. A spring $h^{20}$ connected to the swinging arm $h^{10}$ and a suitable part of the lamp-supporting frame, normally holds the gear wheel $h^9$ out of mesh with the gear pinion $h^{11}$. For some classes of work it is not necessary to circulate the lamps, but when working with a large printing plate, or when for any reason it is desirable to have the lamps circulate, the valve $h^{19}$ is operated to admit air to the cylinder $h^{16}$ to move the piston outwardly and thereby place the gear wheel $h^9$ in mesh with the gear pinion $h^{11}$. As the pinion $h^{11}$ is elongated the gear wheel $h^9$ can move with the light chamber in the inward and outward adjustments thereof without disengaging the pinion $h^{11}$. By first moving the light chamber rearwardly far enough to disengage the gear wheel $h^9$ from the pinion $h^{11}$ and removing the back of the light chamber, the lamps and their operating mechanism can then be swung to the rear, out of the light chamber. The lamp-supporting frame and the parts carried thereby can also be removed bodily from the light chamber to be replaced by a photographic projecting apparatus, by disengaging the frame from its pivots.

$h^{22}$ $h^{23}$, Figs. 6 and 10, represent air circulating pipes connecting with the top and bottom of the light chamber for preventing the undue heating thereof by the lights.

The invention is not restricted to the described construction of the light chamber and its accessories, nor to the described mechanism for moving the light chamber, and other clutch-controlled mechanism for moving the light chamber in the manner hereinafter described can be used.

*Pressure device and its operating mechanism.*—The pressure device, see Figs. 6, 9, and 12–15, comprises a main pressure block or head I having a padded back adapted to bear against the adjacent side of the sensitized plate. a series of concentric independently movable pressure rings or sections I' $I^2$ $I^3$ $I^4$ $I^5$ $I^6$ $I^7$, and a supporting frame $I^8$ for the block I, pressure rings and the ring actuating mechanism. In the construction shown, the pressure block is detachably secured, by hooks or other means, to a cross bar $i$ which is secured by bolts $i'$, or other fastenings, passing through slots at its ends to two blocks $i^2$ which are movable vertically at the opposite sides of the frame $I^8$ and are provided with screw-threaded holes in which work vertical adjusting screws $i^3$ which are journaled in bearings at the opposite sides of the frame $I^8$ of the pressure device. By turning these screws the pressure block I, which is pivoted on a central stud $i^4$ on the frame $I^8$, can be tilted or turned slightly to square the pressure block accurately with the printing plate on the light chamber. The pressure block I can be quickly removed from the cross-bar $i$ by loosening the securing bolts $i'$, and replaced by another block, thereby enabling blocks of different sizes, suitable for the printing plate, to be used. Each of the pressure rings has an internal screw-thread engaging with an externally screw-threaded part of the frame $I^8$, so that by turning the pressure rings they will be forced rearwardly to press the pressure block firmly against the sensitized plate. The central ring $I'$ is screwed on a central boss $i^6$ of the frame and the other rings are screwed on lugs $i^7$ projecting rearwardly from diagonal bars of the frame. A metal wear plate $i^8$ is interposed between the pressure block and the pressure rings, against which the rings are adapted to bear and turn. The wear plate is loosely supported and held from turning by pins $i^9$, Fig. 12, engaging in sockets on the upper portion of the frame $I^8$.
The pressure device is supported so as to be movable toward and from the sensitized plate by bearings $i^{10}$ on the top and bottom of the frame $I^8$ which slide on guide rods $i^{11}$ supported by brackets on the upright front portion $A'$ of the main frame.

K represents an adjusting screw for the pressure device. This screw is secured centrally to a front yoke or cross-bar of the pressure frame $I^8$ and passes through a hollow internally screw-threaded shaft or sleeve $k$ which is journaled to rotate but is held from longitudinal movement in a bearing bracket $k'$ secured to the upright front portion $A'$ of the main frame. The screw sleeve or shaft $k$ is connected by bevel gear wheels $k^2$ to a short upright shaft $k^3$ journaled in the bracket $k'$ and connected by bevel gears $k^4$ and $k^5$ to a shaft $k^6$ which is also journaled in the bracket $k'$ and is connected by bevel gears $k^7$ and $k^8$ to one part of a divided hollow shaft $k^9$ which is journaled in suitable bearings on the bracket $k'$. The other part of the divided shaft $k^9$ is connected by beveled gear wheels $k^{10}$ to a horizontal shaft $k^{11}$, Figs. 1 and 16, which is journaled in suitable bearings on the main frame and is connected by bevel gear wheels $k^{12}$ to the main drive shaft E. The shaft $k^9$ is made hollow for the passage of another shaft through it for the purpose of enabling a compact arrangement of shafts and gearing, and is divided between its ends, and that portion which is geared to the adjusting screw for the pressure device is secured to the driven member of an electric clutch $K'$, while the driving member of said clutch is fixed to the portion of said shaft which is geared to the reversible drive shaft, so that said driving member of the clutch rotates when the drive shaft is driven and said driven member of the clutch is caused to rotate and, through the described gearing, operates the adjusting screw K to move the pressure device in or out by energizing said clutch $K'$. Any other suitable reversible drive mechanism, including an electric clutch, could be employed for operating the pressure device.

*Pressure ring operating mechanism.*—
The several pressure rings are actuated in
succession, the central ring being moved first, then the next and so on. By thus applying the pressure first centrally and then at successively increasing distances from the center of the pressure device, air will not be trapped between the printing plate and the sensitized surface and a more perfect and uniform contact thereof is insured. The mechanism shown for operating the pressure rings is constructed as follows: The several pressure rings are provided with gear teeth and are separately geared to the driven members of several electrical ring clutches, the driving members of which clutches are in turn geared to the driven member of a main ring clutch which has a driving member geared to the main drive shaft, so that when this main ring clutch is energized the driving members of the several individual ring clutches are driven, and any desired number, one or more, of the rings can be successively turned for screwing them inwardly to apply pressure to the pressure block by successively energizing the appropriate ring clutches. Four ring clutches $L'$ $L^2$ $L^3$ and $L^4$ are shown, see Fig. 13, the first three of which are double clutches, each having a central driving member $l$, Fig. 15, and two driven members $l'$ $l^2$, Fig. 15, at opposite sides of the driving member and adapted to be separately driven by the driving member when the magnets for either driven member are energized. The fourth clutch $L^4$ is a single clutch having only one driving member and one driven member.
There are thus seven driven members corresponding to the seven pressure rings in the four clutches. Seven separate clutches could be employed but the double clutches are used to make the mechanism more compact and avoid unnecessary duplication of parts. Electric clutches of any suitable construction can be employed. The driving member $l$ of the clutch $L'$ has a gear rim connected by an idle gear wheel $l^3$ to the gear rim of the driving member of the clutch $L^2$, and by an idle pinion $l^4$ to the gear rim of the driving member of the clutch $L^3$, and the gear rims of the driving members of the clutches $L^2$ and $L^4$ are connected by an idle pinion $l^5$, so that the driving members of all the clutches are caused to rotate together. The driven members of the several clutches have gear rims. $m'$ $m^2$ $m^3$ $m^4$ $m^5$ $m^6$ $m^7$ represent seven shafts which are suitably journaled in bearings secured to the frame $I^8$ of the pressure device, and are provided at their inner ends with gear pinions $m^9$ meshing with the gear rims of the several pressure rings $I'$ $I^2$ $I^3$ $I^4$ $I^5$ $I^6$ $I^7$. The shafts $m'$ $m^2$ and $m^4$ are provided with gear wheels $m^{11}$ $m^{12}$ $m^{13}$ meshing respectively with the gear teeth on the inner driven members of the clutches $L'$ $L^2$ $L^3$, respectively. The shaft $m^3$ has a pinion $m^{14}$ meshing with the driven member of the clutch $L^4$, and the shafts $m^5$ $m^6$ and $m^7$ have pinions $m^{15}$ $m^{16}$ $m^{17}$ which mesh respectively with the gear teeth on the outer driven members of the clutches $L^3$ $L^7$ and $L^2$, respectively. Thus each pressure ring is geared to one of the driven clutch members. The driving member of one of the ring clutches, for instance, the clutch $L'$, is connected to the driven member of a main ring clutch $M'$ by suitable gearing. For instance, the driving member of the clutch is connected by an idle pinion $m^{18}$ to a pinion $m^{19}$, Figs. 12 and 13, which is journaled on the frame $I^8$ of the pressure device and is splined to a shaft $m^{20}$ journaled in the bracket $k'$, so that the pinion $m^{19}$ turns with this shaft but can slide thereon in the in and out movements of the pressure device. The shaft $m^{20}$ is connected by gear wheels $m^{21}$ $m^{22}$, Figs. 12, 18 and 19, to a gear wheel $n^{23}$ which is journaled on the bracket $k'$ and is connected by bevel gear wheels $m^{24}$ $m^{25}$ to a shaft $m^{26}$ to which the driven member of the main ring clutch $M'$ is secured. The driving member of the main ring clutch is connected by a train of gear wheels $m^{27}$, Figs. 6 and 18, to the driving member of the operating clutch $K'$ of the pressure device, or it could be geared to any other part driven by the main shaft $E$ of the machine.

Mechanism of other construction for actuating the pressure device so that the rings apply their pressure in succession in the manner described can be used.

*Controlling means for the plate-holder-adjusting mechanism.*—The clutch-driven mechanism for adjusting the plate holder horizontally is controlled by a motor controller for starting, stopping and reversing the driving motor for the machine, an electrical switch which is actuated manually to close the clutch circuit, and a micrometer controller which is set by hand in accordance with the position to which it is desired to adjust the plate holder horizontally, and which, when the plate reaches the desired position, automatically establishes electrical connections whereby the electrical switch is actuated to open the clutch circuit and stop the motion of the horizontal adjusting mechanism. The clutch-driven mechanism for adjusting the plate holder vertically is also controlled by the motor controller, and a similar electrical switch and adjustable automatically operating micrometer controller for opening the clutch circuit when the plate holder has been adjusted to the required vertical position.

The motor controller O may be of ordinary construction, that illustrated having a contact cylinder adapted to be turned in one direction from a neutral position for starting the motor and controlling its forward motion, and to be turned in the opposite direction from the neutral position for reversing the motor and controlling its reverse motion. The controller is, however, provided with contacts for controlling various operating circuits hereinafter explained.

The micrometer controllers N and P for the horizontal and vertical adjusting mechanisms are arranged, as shown in Figs. 1 and 5, at the front of the machine in a convenient location where they can be readily seen and actuated by the operator. As shown, see Figs. 1, 5, and 22–24, the controller N comprises four wheels $N'$ $N^2$ $N^3$ $N^4$, and the controller P comprises four wheels $P'$ $P^2$ $P^3$ $P^4$ which are suitably journaled side by side on a shaft $n$ supported in a frame or bracket $n'$ at one side of the upright front portion $A'$ of the main frame. The front portions of the wheels are inclosed by a cover or shield $n^2$ provided with slots $n^3$ through which the wheels can be seen. The wheel $N'$ of the controller N is provided on its periphery with a scale divided into equal divisions corresponding in number to the number of inches (or other units of measure) which the plate holder B travels horizontally, and the wheel $N^2$ has a peripheral scale representing fractions of the units indicated on the first wheel. For instance, the circumference of the wheel $N^2$ is divided into five hundred equal parts, each representing one five-hundredth of an inch travel of the plate holder. These wheels $N'$ and $N^2$ are geared to the horizontal adjusting mechanism for the plate holder so that the units wheel is turned one complete revolution during the complete horizontal travel of the plate holder, and the fractions wheel $N^2$ is turned one revolution for each movement of the units wheel N' one inch or unit space. In the construction shown, the fractions wheel $N^2$ has a gear rim which meshes with a pinion $n^4$ on a horizontal shaft $n^5$ which is connected by bevel gear wheels $n^6$ $n^7$, Figs. 16 and 23, to an inclined shaft $n^8$ which is connected by bevel gear wheels $n^9$ $n^{10}$ to a horizontal shaft $n^{11}$, Figs. 16 and 23, which is connected by gear wheels $n^{12}$ $n^{13}$ to the horizontal screw shaft D', which moves the plate holder carriage horizontally. The units wheel N' is driven from the pinion $n^4$ by a reducing gearing, Figs. 24 and 25, comprising a pinion $n^{14}$ which meshes with the pinion $n^4$ and is connected by bevel pinions $n^{15}$ to a shaft provided with a worm $n^{16}$ which meshes with a worm wheel $n^{17}$ which rotates freely on the shaft $n^5$ and is fixed to a pinion $n^{18}$ which meshes with a toothed rim on the units wheel N'. This reducing gearing is mounted in a suitable bearing bracket $n^{19}$, Fig. 24, on the supporting frame n' for the micrometer controller.

The wheel $N^3$ of the micrometer controller, next to the units wheel N', is graduated the same as the units wheel, and the other wheel $N^4$, next to the fractions wheel $N^2$, is graduated the same as the fractions wheel. These two wheels $N^3$ and $N^4$ are adapted to be rotatably adjusted by hand, each wheel being preferably provided with a gear rim with which meshes a pinion $n^{20}$ provided with a crank handle for turning it to revolve the wheel. These crank wheels $n^{20}$ are journaled on arms extending from a supporting shaft $n^{21}$, and a spring-actuated latch $n^{22}$, adapted to engage the wheel $n^{20}$, is provided for holding each crank wheel and the micrometer wheel $N^2$ in the adjusted position.

$n^{23}$ represents a contact ring which is secured to and insulated from the adjustable units wheel $N^3$ and which turns in contact with a stationary brush or contact device $N^5$ secured on and insulated from the supporting frame of the micrometer controller, and $n^{24}$ is a ring which is connected to the contact ring $n^{23}$ and insulated from the wheel $N^3$. An adjustable contact $n^{25}$ secured to this ring $n^{24}$ is adapted to engage a coöperating contact $n^{26}$ carried by the driven units wheel N'. The driven fractions wheel $N^2$ carries a contact $n^{27}$ adapted to engage with a contact $n^{28}$ carried by a contact ring $n^{29}$ which is secured to but insulated from the adjustable fractions wheel $N^4$ and turns in contact with a stationary brush or contact device $N^6$ secured to the frame of the micrometer controller. The contacts $n^{26}$ and $n^{27}$ are arranged on arms $n^{30}$ and $n^{31}$ which are secured to and insulated from the wheels N' and $N^2$ but are in electrical contact with each other at their hubs. If the adjustable units and fractions wheels $N^3$ and $N^4$ are turned to positions representing a predetermined desired travel of the plate holder, indicated by the numbers on these wheels opposite the holes $n^3$ in the cover $n^2$ of the controller, then when the adjusting mechanism has been set in operation and the plate holder has traveled this distance and driven the units and fractions wheels N' $N^2$ through corresponding distances, the contact $n^{26}$ on the driven units wheel and the contact $n^{27}$ on the driven fractions wheel will be brought into engagement respectively with the contacts $n^{25}$ and $n^{28}$ on the adjustable units and fractions wheels $N^3$ and $N^4$, thus placing the brush $N^5$ in electrical connection with the brush $N^6$ so that a current can pass from one brush to the other. These brushes are electrically connected with the motor controller O, the clutch of the horizontal adjusting mechanism for the plate holder, and the clutch switch, in the manner presently described, so that the electrical connection of the brushes $N^5$ and $N^6$, as explained, will stop the action of the clutch. The units wheel is also provided with a contact finger $n^{32}$, Figs. 22 and 42, which is adapted to engage and electrically connect the two members of a stationary contact $N^7$ for stopping the clutch E' when the micrometer wheels N' and $N^2$ are returned to the initial position.

The several wheels P' $P^2$ $P^3$ $P^4$ of the micrometer controller P for the vertical adjusting mechanism are graduated and operate like the corresponding wheels of the controller N except that the driven units wheel P' makes one revolution during the complete vertical travel of the plate holder, and its scale is divided into a number of equal unit divisions representing the number of inches which the plate holder travels vertically. As shown, the fractions wheel $P^2$ is geared to a pinion p' on a shaft $p^2$ which is connected by bevel gear wheels $p^3$ $p^4$ to an inclined shaft $p^5$ which is connected by bevel gear wheels $p^6$ $p^7$ to a horizontal shaft $p^8$ which is connected by gear wheels $p^9$ $p^{10}$ to a gear wheel $p^{11}$ on the horizontal operating shaft C' for the vertical adjusting mechanism for the plate holder, see Figs. 16 and 23. The shaft $p^2$ is hollow and sleeved on the shaft $n^5$; the shaft $n^8$ is hollow and sleeved on the shaft $p^5$, and the shaft $n^{11}$ is hollow and sleeved on the shaft $p^8$, as shown, for the purpose of making the drive mechanism for the micrometer controllers more compact and reducing the number of bearings. The units wheel P' is driven from the pinion p' by a reducing gearing similar to that employed in the other micrometer controller and comprising a pinion $p^{12}$ meshing with the pinion p' and connected by bevel gear wheels $p^{13}$ to a shaft provided with a worm $p^{14}$ meshing with a worm wheel $p^{15}$ fixed to a pinion $p^{16}$ which is loose on the hollow shaft $p^2$ and meshes with the toothed rim of the units wheel P', as shown in Figs. 23 and 24. This drive mechanism turns the fractions wheel $P^2$ one revolution and the units wheel P' one unit's space for every inch which the plate holder B' is moved vertically. Any other suitable mechanism for turning these wheels at the relative rates mentioned, when the plate holder is moved vertically, can be employed.

The wheel $P^3$ carries a contact ring $p^{23}$ which turns in contact with a brush or contact device $P^5$, and an adjustable contact $p^{25}$ adapted to engage a coöperating contact $p^{26}$ carried by the driven units wheel P', and the driven fractions wheel carries a contact $p^{27}$ adapted to engage a coöperating contact $p^{28}$ secured to a contact ring $p^{29}$ which is carried by the adjustable fractions wheel $P^4$ and turns in contact with a stationary brush or contact device $P^6$. These parts are arranged and operated in the same manner as the corresponding parts of the micrometer controller N to place the brushes $P^5$ and $P^6$ in electrical connection when the driven units and fractions wheels P' and $P^2$ have been revolved by the vertical adjustment of the plate holder B' so as to place their contacts $p^{26}$ and $p^{27}$ in engagement respectively with the contacts $p^{25}$ and $p^{28}$ on the adjustable units and fractions wheels $P^3$ and $P^4$. The driven units wheel P' also carries a contact finger $p^{32}$, Figs. 22 and 42, adapted to engage a stationary contact $P^7$ for stopping the vertical adjustment clutch $E^2$ when the micrometer wheels P' and $P^2$ have been returned to the initial position.

Q and Q' represent the switches for closing and opening the electrical circuits of the clutches E' and $E^2$ respectively of the horizontal and vertical adjusting mechanisms of the plate holder B'. These switches are mounted on a suitable switchboard $Q^2$, Fig. 1, located at a convenient position at the front portion of the machine where they are within reach of the operator. The two switches are alike and only the first one will be described in detail. This switch, see Fig. 42, comprises a hand-actuated lever on the front side of the switch-board provided with parallel arms $q$ $q'$ insulated from each other and adapted to engage contacts $q^3$ and $q^4$, and a second lever pivoted on the rear side of the switch-board and having parallel arms $q^5$ and $q^6$ which are insulated from each other and are adapted to respectively engage contacts $q^7$ and $q^8$. A link $q^9$ connected to the hand lever $q$ $q'$ passes through the switch-board and has a sliding connection with the lever $q^5$ $q^6$, so that when the hand lever is pulled out of engagement with its contacts the other lever is moved into engagement with its contacts but is not moved when the hand lever $q$ $q'$ is pushed into engagement with its contacts. The lever $q^5$ $q^6$ is held in engagement with its contacts $q^7$ $q^8$ by a latch $q^{10}$ which is moved to release the lever by a solenoid $q^{11}$, and when this lever $q^5$ $q^6$ is released it is opened or moved out of engagement with its contacts $q^7$ $q^8$ by a spring $q^{12}$. The switch contacts $q^3$ $q^4$ are connected by conductors 1, 2 respectively to a supply line or source of current. The lever arms $q$ $q'$ are connected respectively by conductors 3 and 4 to the contacts $q^7$ and $q^8$. When it is desired to adjust the plate holder B', for example in one direction, horizontally, the motor controller is turned to the left in Fig. 43 to cause the motor to drive forwardly, and the hand lever $q'$ $q^2$ of the switch Q is pulled outwardly and then shoved in again to place the two switch levers in engagement with their contacts. An electric circuit is then completed from the supply line through the conductor 1, switch contact $q^3$, switch arm $q'$, conductor 3, contact $q^7$, switch arm $q^5$, a conductor 5, thence through the clutch E', a conductor 6, a movable contact plate 7 of the motor controller O, a conductor 8, switch arm $q^6$, contact $q^8$, the conductor 4, switch arm $q$, contact $q^4$, and the conductor 2 back to the supply line. The clutch E' will thus be energized and its driven member will turn forwardly with the driving member thereof and drive the horizontal adjusting mechanism so as to move the plate holder horizontally in one direction. The wheels N' and $N^2$ of the micrometer controller N are revolved by the gearing connecting them with the horizontal adjusting mechanism until the contacts carried thereby are brought into engagement with the contacts on the adjustable wheels $N^3$ and $N^4$ of the micrometer controller, which will place the two brushes $N^5$ $N^6$ of the controller in electrical connection, as before explained. An electrical circuit will then be established from the supply line through the conductor 1, contact $q^3$, switch arm $q'$, a conductor 9, solenoid $q^{11}$, a conductor 10, brush $N^5$, through the micrometer controller N, brush $N^6$, a conductor 11, a contact plate 12 of the motor controller, a conductor 13, switch arm $q$, contact $q^4$, and the conductor 2 back to the supply line. The solenoid $q^{11}$ is thus energized and actuates the latch $q^{10}$ to release the switch lever $q^5$ $q^6$ which is then moved out of engagement with its contacts by the spring $q^{12}$. This breaks the circuit through the clutch E' and stops the horizontal adjusting mechanism with the plate holder in the required horizontal position. If it is desired to move the plate holder farther in the same direction to a new position, it is only necessary to set the adjustable wheels $N^3$ $N^4$ of the micrometer controller N in the same manner as before, for the required new position, and again move the hand lever of the switch Q outwardly and inwardly. The clutch will then be operated and the micrometer controller N driven in the same manner as before until the contacts on the driven wheels of the micrometer controller are brought into engagement with the contacts on the adjustable wheels and again cause the adjusting mechanism to be arrested in the same manner as before explained. When it is desired to reverse the motion of the horizontal adjusting mechanism and return the plate holder to the initial position, the handle of the motor controller O is turned to reverse the motion of the motor and the hand lever of the switch Q is again pulled out and shoved in. The clutch E' will be excited as before except that the circuit wll be completed through a conductor 14, a reversing contact plate 15 of the motor controller O which is connected to the conductor 8 instead of through the contact plate 7 of the controller, as before explained. The motor will then drive the clutch and the horizontal adjusting mechanism in the reverse direction and the wheels N' N² of the micrometer controller will also be driven in the reverse direction until the contact finger $n^{32}$ on the units wheel N' of the micrometer controller engages the cutout contact N⁷ of the controller. The current will then flow from the supply line through the conductor 1, contact $q^3$, switch arm $q'$, conductor 9, solenoid $q^{11}$, a conductor 16, cutout contact N⁷ of the micrometer controller, a conductor 17, a movable contact plate 18 of the motor controller O, a conductor 19, the conductor 13, switch arm $q$, contact $q^4$, and conductor 2 back to the supply line. This current will energize the solenoid $q^{11}$ and again cause the switch lever $q^5$ $q^6$ to be opened as before explained, to break the clutch circuit and stop the horizontal adjusting mechanism with the plate holder and the micrometer controller in the initial positions.

The electrical switch Q' for the vertical adjusting mechanism is electrically connected to the clutch E² and the micrometer controller P of the vertical adjusting mechanism for the plate holder B' and the motor controller O in the same way as above explained, and the vertical adjustment of the plate holder is effected just as the horizontal adjustment except that the micrometer controller P is set for the required adjustment instead of the controller N and the switch Q' is actuated instead of the switch Q, as will be apparent from the diagram Fig. 42.

Micrometer controllers N and P and a switch Q have been above described in detail to enable a complete understanding of the means for controlling the adjustments of the plate holder, but the invention is not restricted to the described construction of these devices, and other means coöperating with each other in an analogous manner to control the adjustments of the plate could be employed.

R S represent respectively the micrometer controllers for regulating the movements of the light chamber and of the pressure device, T the adjustable controller for determining the number of pressure rings which are used, and U the adjustable controller for regulating the period of time which the lamps remain lighted for the exposure. These four controllers are preferably arranged side by side in a convenient location at the front portion of the machine, where they can be readily adjusted and observed by the operator, see Figs. 1, 5 and 9.

*Controlling means for the light chamber and the pressure device.*—The micrometer controller R for the light chamber (see Figs. 26-28) is similar in construction to the micrometer controllers N and P for adjusting the plate holder, and consists of a driven units wheel R', a driven fractions wheel R², an adjustable units wheel R³, and an adjustable fractions wheel R⁴. These wheels are journaled on a shaft $r$ supported in a bracket or part of the front portion A' of the main frame and partially inclosed by a cover or shield $r'$ provided with openings through which the graduated peripheries of the wheels can be seen. The wheels of the other controllers, S, T, U, are journaled on the shaft $r$ beneath the cover $r'$. The driven units and fractions wheels are suitably geared to the operating mechanism for the light chamber. For instance, the driven fractions wheel R² is provided with a gear rim which meshes with a pinion $r^2$ which is secured to a hollow shaft $r^3$ arranged parallel with the controller shaft $r$. This shaft has a pinion $r^4$ meshing with a pinion $r^5$ which is loosely journaled on the shaft $k^6$ of the operating mechanism for the pressure device and is fixed to a bevel pinion $r^6$ which meshes with a bevel pinion $r^7$, Fig. 12, on an inclined shaft $r^8$ which passes through the hollow shaft $k^9$ for the operating clutch K' of the pressure device and is geared by bevel pinions $r^9$ to a shaft $r^{10}$, Figs. 12 and 16, which extends horizontally across the machine and is geared by bevel pinions $r^{11}$ to the shaft $g^6$ which is driven by the driven member of the clutch G' for the light chamber. This gearing turns the fractions wheel in one direction or the other one revolution for each inch that the light chamber is moved toward or from the sensitized plate. The driving pinion $r^2$ for the fractions wheel R² is geared to the units wheel R' for turning this wheel through an arc equal to one of its units divisions for each complete revolution of the fractions wheel, by a suitable speed reducing gearing $r^{12}$, Fig. 26.

The wheel $r^{13}$ of this reducing gearing is loose on the shaft $r^3$ and meshes with the gear rim of the units wheel. The adjustable units wheel $R^3$ is provided with a contact ring $r^{14}$ which rotates in engagement with a stationary contact brush or device $R^5$, Fig. 27, and the adjustable fractions wheel $R^4$ is also provided with a contact ring $r^{15}$ which rotates in contact with a stationary brush or contact device $R^6$. The adjustable units wheel carries an adjustable contact $r^{16}$ which is in electrical connection with the contact ring $r^{14}$ thereon and is adapted to engage a coöperating contact $r^{17}$ carried by the driven units wheel $R'$, and the driven fractions wheel $R^2$ carries a contact $r^{18}$ adapted to engage a coöperating contact $r^{19}$ secured to the contact ring of the adjustable fractions wheel $R^4$. The contacts $r^{17}$ and $r^{18}$ are secured respectively to arms $r^{20}$ and $r^{21}$ which are respectively secured to but insulated from the driven units and fractions wheels and have hub portions which bear upon each other. The adjustable units and fractions wheels are set to indicate the required inward movement of the light chamber, and when the clutch-driven operating mechanism for the light chamber is driven the units and fractions wheels $R'$ and $R^2$ are rotated until the contacts carried thereby respectively engage the contacts carried by the adjustable units and fractions wheels, when the brushes $R^5$ and $R^6$ will be electrically connected and establish an electric circuit, as hereinafter explained, for stopping the light chamber clutch to arrest the light chamber and starting the operating clutch of the pressure device. The units wheel $R'$ is also provided with a contact finger $r^{22}$ adapted to engage a stationary contact device $R^7$, Figs. 38 and 43, for stopping the operating clutch for the light chamber, when the light chamber and said wheel $R'$ are returned to their initial positions.

The micrometer controller S for the pressure device, like that of the light chamber, also comprises a driven units wheel $S'$, a driven fractions wheel $S^2$, an adjustable units wheel $S^3$, and an adjustable fractions wheel $S^4$. The driven wheels are geared to the clutch driven adjusting mechanism for the pressure device. For instance, as shown in Figs. 12 and 26, the fractions wheel $S^2$ has a gear rim which meshes with a pinion $s$ which is secured to a hollow shaft $s'$ which passes through the hollow shaft $r^3$ and is provided with a pinion $s^2$ which meshes with a pinion $s^3$ which is secured to the bevel pinion $k^5$ on the shaft $k^6$ of the operating mechanism for the pressure device. The fractions wheel $S^2$ is thus driven when the clutch driven mechanism for the pressure device is in operation, and the driven units wheel $S'$ is driven from the driving pinion $s$ for the fractions wheel by suitable speed reducing gearing $s^4$ which is similar to the speed reducing gearing for the units wheel of the controller R for the light chamber. The adjustable units and fractions wheels $S^3$ and $S^4$ are provided with contact rings $s^5$ and $s^6$, respectively, which rotate in contact with stationary brushes or contact devices $S^5$ and $S^6$, respectively. The adjustable units wheel carries an adjustable contact $s^9$ in electrical connection with the contact ring $s^5$ and is adapted to be engaged by a contact $s^{10}$ on the driven units wheel $S'$, and the driven fractions wheel $S^2$ carries a contact $s^{11}$ adapted to engage a contact $s^{12}$ on the fractions wheel $S^4$. As in the case of the controller for the light chamber, the adjustable units and fractions wheels $S^3$ and $S^4$ are set to the positions indicating the required adjustment of the pressure device, and when the contacts on the driven units and fractions wheels are brought into engagement with the contacts of the adjustable wheels by the revolution of the former wheels by their driving mechanism, the brushes $S^5$ and $S^6$ will be placed in electrical connection and establish an electrical circuit, as hereinafter explained, for stopping the clutch operating mechanism of the pressure device and starting the operating clutch for the pressure rings.

$s^{15}$ represents a contact finger on the units wheel $S'$ adapted to engage a stationary contact device $S^7$ when the pressure device and said wheel $S'$ are returned to their initial positions for stopping the operating clutch for the pressure device and starting the reverse action of the operating clutch for the light chamber.

*Pressure ring controlling device.*—The pressure ring controlling device shown (see Figs. 26–28, 32–35 and 41) comprises two contact wheels $T'$ and $T^2$, and two driven wheels $T^3$ $T^4$ arranged between the contact wheels. The driven wheel $T^3$ is provided with a gear rim which meshes with a pinion $t$ secured to a shaft $t'$ which passes through the shaft $s'$ and is journaled in bearings on the supporting bracket for the micrometer controllers. This shaft $t'$ is provided with a pinion $t^2$ Fig. 26 meshing with a pinion $m^{21}$ which is driven by the main ring clutch $M'$ so that the controller wheel $T^3$ is rotated when the main ring clutch is set in action. The other driven wheel $T^4$ is driven at a suitable differential speed relative to the wheel $T^3$ by a suitable speed reducing gearing $t^3$ which may be similar to the speed reducing gearing for the micrometer controllers. The two contact wheels $T'$ and $T^2$ are provided with insulated contact rings $t^4$ and $t^5$, respectively, which rotate in contact with stationary brushes or contact devices $T^5$ and $T^6$, respectively.

$t^6$ represents a contact ring which is mounted on but insulated from the adjustable wheel $T^2$ and in electrical connection with the contact ring $t^5$ and carries a series of laterally projecting contacts $t^7$, one for each of the rings of the pressure device. The contact ring $t^4$ on the other contact wheel $T'$ is provided with a plurality of laterally projecting adjustable contacts $t^8$, five of which are shown. The driven wheel $T^4$ is provided with a contact device $t^9$ adapted to successively engage the seven contacts $t^7$, and the driven contact wheel $T^3$ is provided with a contact device $t^{10}$ adapted to successively engage the several contacts $t^8$. The contacts $t^7$ and $t^8$ are so spaced relative to each other, depending upon the relative speeds of the two driven wheels $T^3$ and $T^4$, that whenever the contact $t^9$ on the wheel $T^4$ engages one of the contacts $t^7$, the contact $t^{10}$ on the wheel $T^3$ will engage one of the other contacts $t^8$ and thereby place the brushes $T^5$ and $T^6$ in electrical connection for establishing electrical circuits for energizing the ring operating clutches in succession, as hereinafter explained. Any number of the contacts $t^8$ and relative arrangement of the same and the contacts $t^7$ adapted to accomplish this result can be used. The contacts $t^9$ and $t^{10}$ are carried by arms $t^{12}$ and $t^{11}$ which are mounted on but insulated from the wheels $T^3$ $T^4$ but are in electrical connection with each other at their hubs.

$t^{13}$ represents an adjustable ring which is carried by the wheel $T^2$ and is adapted to be turned to different positions thereon. As shown, the ring $t^{13}$ is retained on the wheel by a flange on the ring entering a groove in the inner side of the rim of the wheel $T^2$ and the ring is split and tends to expand in the wheel so as to frictionally engage the wheel. The ring is provided with projecting pins $t^{14}$ or other means for turning it and has holes $t^{15}$ in which a dog $t^{16}$ is adapted to engage for holding the ring in different positions.

$t^{17}$ represents a contact which is secured to and insulated from the adjustable ring $t^{13}$ and has a finger which bears against the contact ring $t^6$ on the wheel $T^2$ and also has an arm which is adapted to engage a contact $t^{18}$ carried by the wheel $T^4$. This contact $t^{18}$ is insulated from the wheel $T^4$ but is electrically connected to a contact band $t^{19}$ which is carried by and insulated from the wheel and rotates in engagement with a stationary contact brush or device $T^7$.

The pressure rings $I'$—$I^7$, owing to their different diameters, have to be turned different distances in order to screw them inwardly an equal distance toward the sensitized plate. The wheels $T^3$ and $T^4$ are driven at differential speeds such that when the first pressure ring has been screwed inwardly the proper distance the controller wheels $T^4$ and $T^3$ will revolve enough to move the contact $t^9$ on the wheel $T^4$ from the first of the seven contacts $t^7$ into engagement with the next one and to move the contact $t^{10}$ on the wheel $T^3$ into engagement with one of the five contacts $t^8$ so as to establish a circuit for stopping the operating clutch for the first pressure ring and starting the clutch for the second pressure ring. In like manner, when the second pressure ring has been screwed in the proper distance the contact $t^9$ will be brought into engagement with the contact $t^7$ and the contact $t^{10}$ into engagement with one of the five contacts $t^8$, so as to again establish a circuit for stopping the clutch for the second pressure ring and starting the operating clutch for the third ring, the several pressure rings being thus operated in succession. When the contact $t^{18}$ on the wheel $T^4$ engages the contact $t^{17}$ the brushes $T^5$ and $T^7$ will be placed in electrical connection through the rings $t^5$ $t^6$, contacts $t^{17}$ $t^{18}$ and band $t^{19}$ and a circuit will be established as hereinafter explained, for stopping the main ring driving clutch $M'$ to prevent further action of the pressure rings. The contact $t^{17}$ being carried by the adjustable ring $t^{13}$ can be set so as to stop the main ring driving clutch after any desired number of pressure rings have been moved inwardly, thereby enabling one, two or more of the pressure rings to be used as required.

$t^{20}$ represents a contact finger carried by the driven wheel $T^4$ and adapted to engage a stationary contact device $T^8$, Fig. 41, when the wheel has been returned to the initial position to establish a circuit for stopping the reverse action of the main ring clutch and starting the clutch $K'$ for retracting the pressure device.

The controllers R S and T are arranged side by side as described in order to have them close together where they can all be readily seen and set by the operator, and the driving shafts $r^3$ $s'$ and $t'$ for the controller wheels are arranged one within the other to simplify the construction and reduce the number of parts. The described arrangement and construction of the several controllers and their actuating mechanisms are not, however essential and devices of other construction adapted to perform the described functions could be employed.

*Time controller.*—U represents the controller for regulating the length of exposure of the sensitized plate to the light. This controller preferably comprises a wheel with a toothed rim journaled on the shaft $r$ beside the light chamber controller R, and connected by suitable gears $u$, Fig. 39, to a ratchet wheel $u'$ which is revolved intermittently by a pawl $u^2$ actuated by a solenoid or electric magnet $u^3$ which is controlled by a clock mechanism, as hereinafter described.

$u^4$ represents a conductor ring which is secured to and insulated from the controller wheel U and rotates in contact with a brush or contact device $u^5$. This ring carries a contact finger $u^6$ adapted to engage a stationary contact $U^6$. The controller wheel is turned forwardly by hand a greater or less distance, depending upon the required exposure, and when the time mechanism is set in operation it will be turned in the opposite direction (indicated by the arrow in Fig. 39) until the contact finger $u^6$ engages the stationary contact $U^6$ and establishes a circuit which stops the time mechanism and extinguishes the lamps. The controller wheel U has a peripheral scale enabling it to be set for any required period of exposure.

The adjustable wheels $R^3$ and $R^4$ of the controller for the light chamber, $S^3$ and $S^4$ of the controller for the pressure device and the time controller wheel U can be adjusted by latch-controlled hand wheels $u^7$, similar to those used for the controllers of the adjusting mechanism for the plate holder, or in any other suitable way.

*Circuit changing devices.*—V and V' represent automatic switches or circuit-changing devices which coöperate with the controllers R, S, T and U for changing the electrical circuits to cause the operation of the light chamber, pressure device, pressure rings and time mechanism in the proper manner.

The automatic switch V, in the construction shown, comprises a stationary disk or plate $v$ provided with a series of pairs of insulated contacts, and a rotatable disk or plate $v'$ provided with two conductor rings $v^2$ $v^3$ which are insulated from each other and turn in contact with brushes or contact pieces $v^4$ and $v^5$, respectively. The rotary disk $v'$ is secured to a shaft $v^6$ provided with two oppositely arranged ratchet wheels $v^7$ and $v^8$ with which coöperate two pawls $v^9$ and $v^{10}$ for turning the shaft and disk $v'$ intermittently either in a forward or reverse direction. The pawls $v^9$ and $v^{10}$ are respectively connected by levers or otherwise to actuating solenoids $v^{11}$ and $v^{12}$. The rotary disk $v'$ carries two contacts $v^{13}$ and $v^{14}$ respectively connected with the conductor rings $v^2$ $v^3$ and adapted to be moved by the intermittent rotation of the disk to engage one pair after another of four pairs of contacts $v^{15}$ on the stationary disk $v$. The rotary disk $v'$ also carries a two-pole contact $v^{16}$ which is insulated from the disk and is adapted to be moved by the intermittent rotation of the disk to connect together the contacts of one pair after another of four pairs of contacts $v^{17}$ on the stationary disk $v$. The rotary disk $v'$ normally stands in a neutral position in which its contacts $v^{13}$ $v^{14}$ and $v^{16}$ stand between the two series of contacts on the stationary disk and do not engage any of these contacts. The several pairs of contacts $v^{15}$ on the stationary disk $v$ are connected respectively by conductors 21 and 22 to the two terminals of the operating clutch G' for the light chamber, by conductors 23 and 24 to the two terminals of the operating clutch K' for the pressure device, by conductors 25 and 26 to the two terminals of the main ring clutch M', and by conductors 27 and 28 to the two terminals of the light circuit. The brushes $v^4$ and $v^5$ of the circuit-changer V are connected respectively to conductors 29 and 30 which are connected by a pair of contacts 31 of the motor controller to the main line or source of current when the motor controller is turned to the position indicated in Fig. 43, to drive the motor forwardly. The conductors 29 and 30 have branches 32 and 33 respectively leading to a pair of contacts 34 of the controller O for connecting the brushes $v^4$ and $v^5$ to the main line when the motor is reversed. The opposite terminals of the solenoid $v^{11}$ for turning the circuit-changer V forwardly are connected to conductors 35 and 36 leading to a pair of contacts 37 of the motor controller for connecting the solenoid to the main line. One terminal of the solenoid $v^{11}$ is connected by branches of the conductor 36 to one of each pair of contacts $v^{17}$ of the circuit-changer V, and the other contact of each pair of contacts $v^{17}$ is connected by a conductor 38 and branches thereof to the brushes $R^6$ $S^6$ $T^7$ and $U^6$ of the several controllers R S T and U, respectively. The brushes $R^5$ $S^5$ $T^5$ and $U^5$ of the controllers R S T and U are connected to a conductor 39 leading to one of the pair of contacts 37 of the motor controller O.

The automatic switch or circuit-changing device V' is similar in its general construction to the circuit-changer V. It comprises a stationary contact disk or plate $v^{20}$ and a rotary disk or plate $v^{21}$ provided with conductor rings $v^{22}$ $v^{23}$ which are insulated from each other and are engaged by brushes or contact devices $v^{24}$ and $v^{25}$, respectively. The rotary disk or plate is secured to a shaft $v^{26}$ which is provided with oppositely arranged ratchet wheels $v^{27}$ and $v^{28}$ adapted to be turned by pawls $v^{29}$ and $v^{30}$, respectively. The pawls are respectively connected by levers or otherwise to actuating solenoids $v^{31}$ and $v^{32}$. When the solenoid $v^{31}$ is energized the pawl connected thereto will be actuated and turn the disk $v^{21}$ forwardly to move two contacts $v^{33}$ $v^{34}$ carried thereby, and in connection with the conductor rings $v^{22}$ and $v^{23}$ to engage one or another of seven pairs of contacts $v^{35}$ on the stationary disk $v^{20}$. When the other solenoid $v^{32}$ is energized the pawl actuated thereby will rotate the disk $v^{21}$ to move the contacts $v^{33}$ and $v^{34}$ in the reverse direction from one pair of contacts $v^{35}$ on the stationary disk to the next pair of contacts. Each pair of contacts $v^{35}$ is connected by suitable conductors to the terminals of one of the seven clutches for operating the pressure rings $I'$—$I^7$.

$V^2$ represents a hand operated starting switch of suitable construction, interposed, for instance, in the conductor 36, for closing the circuit to energize the solenoid $v^{11}$ momentarily and turn the circuit-changer V forwardly one step. This switch is preferably located on the switch-board $Q^2$ at the front of the machine, and is of a sort adapted to close the circuit momentarily and open it again by a single movement of the switch lever so that the switch cannot be left closed accidentally, but any suitable switch can be employed, and as the construction of the same is not claimed herein, it is not described in detail.

*Operation of the machine.*—Assuming that the plate holder $B'$ has been adjusted to place the sensitized plate in the required position, and that the several adjustable controllers R S T and U have been set, as explained, to determine the inward movements of the light chamber and pressure device, the number of pressure rings to be operated and the length of the exposure, the automatic operation of the machine is as follows, see particularly Fig. 43: The handle of the motor controller O is turned to cause the forward rotation of the motor, and the starting switch $V^2$ is actuated to start the machine. This establishes a circuit from the main line through one of the contacts 37 of the motor controller O, conductor 35, the solenoid $v^{11}$ of the circuit-changer V, and conductor 36 back to the line through the other contact 37. The solenoid $v^{11}$ is thus energized and turns the circuit-changer V forwardly one step and places its contacts $v^{13}$ and $v^{14}$ in engagement with the first pair of contacts $v^{15}$ and its contact $v^{16}$ in engagement with the first pair of contacts $v^{17}$. Current will then flow from the line through the motor controller contact 31, conductor 30, brush $v^5$, conductor ring $v^3$, contact $v^{14}$, conductor 22, operating clutch $G'$ for the light chamber, conductor 21, contact $v^{13}$, conductor ring $v^2$, brush $v^4$, conductor 29, and the other contact 31 back to the line. This current energizes the clutch $G'$ and causes its driven member to turn forwardly with its driving member and, by means of the operating mechanism described, move the light chamber toward the sensitized plate. When the light chamber reaches the position determined by the adjustment of its controller R the brushes $R^5$ and $R^6$ of this controller will be placed in electrical connection, as explained, and establish a circuit from the line through one of the motor controller contacts 37, conductor 39, brush $R^5$, controller R, brush $R^6$, conductor 38, contact $v^{16}$, conductor 36, solenoid $v^{11}$, conductor 35 and the other contact 37 back to the line. The solenoid $v^{11}$ is thus operated to turn the circuit-changer V another step forwardly, which moves the contacts $v^{13}$ $v^{14}$ to the second pair of contacts $v^{15}$ and the contact $v^{16}$ to the second pair of contacts $v^{17}$. This stops the clutch $G'$ and arrests the light chamber and also places the operating clutch $K'$ for the pressure device in connection with the line through the circuit changer V in the same manner that the clutch $G'$ was connected to the line. The clutch $K'$ then moves the pressure device toward the sensitized plate and drives the controller S by means of the described operating mechanism. When the pressure device reaches the position determined by the adjustment of its controller S the brushes $S^5$ and $S^6$ of this controller are placed in electrical connection, as explained, and again connect the solenoid $v^{11}$ to the line as in the case of the controller R, thereby turning the circuit changer V another step forwardly and moving its contacts $v^{13}$ $v^{14}$ to the third pair of contacts $v^{15}$, and the contact $v^{16}$ to the third pair of contacts $v^{17}$. This stops the clutch $K'$ and arrests the pressure device and also places the main ring clutch $M'$ in connection with the line through the circuit-changer V in the same manner that the clutch $G'$ was connected to the line. The main ring clutch then drives the driving members of the operating clutches $L'$—$L^4$ for the several pressure rings $I'$ $I^2$ $I^3$ $I^4$ $I^5$ $I^6$ $I^7$ and the pressure ring controller T by the mechanism described. When the traveling contact $t^9$ of this controller engages the first of the seven pressure ring contacts $t^7$, the brushes $T^5$ and $T^6$ of this controller are placed in electrical connection, as explained, and establish a circuit from the main line through one of a pair of motor controller contacts 40, a conductor 41, brush $T^5$, controller T, brush $T^6$, a conductor 42, the solenoid $v^{31}$ of the circuit-changer $V'$, a conductor 43 and the other contact 40 back to the line. The solenoid $v^{31}$ is thus operated and turns the circuit-changer $V'$ forwardly one step, causing its contacts $v^{33}$ $v^{34}$ to engage the first pair of contacts $v^{35}$ which are connected to the terminals of the operating clutch $L'$ for the first pressure ring $I'$. Current then flows from the main line through one of the contacts 31, a conductor 44, brush $v^{25}$, ring $v^{23}$, contact $v^{34}$, the ring clutch $L'$, contact $v^{33}$, ring $v^{22}$, brush $v^{24}$, conductor 45 and the other contact 31 back to the line, thus causing the driven member of the ring clutch $L'$ to turn with the driving member and screw the central pressure ring $I'$ in to apply pressure to the sensitized plate. When the traveling contact $t^9$ of the ring controller T engages the second pressure ring contact $t^7$, the solenoid $v^{31}$ is energized again, as before, and turns the circuit-changer V' forwardly another step to move its contacts $v^{33}$ $v^{34}$ from the first pair of contacts $v^{35}$ to the next pair, thereby disconnecting the first ring clutch L' from the line and arresting the central pressure ring and connecting the operating clutch for the second pressure ring I² to the line. The rings I'—I⁷ are thus operated in succession until the traveling contact $t^{18}$ of the controller T engages the adjustable contact $t^{17}$ and places the brushes T⁵ and T⁷ of this controller in electrical connection, as explained, and thus connects the solenoid $v^{11}$ of the circuit-changer V to the line through one of the motor controller contacts 37, conductor 39, brush T⁵, controller T, brush T⁷, conductor 38, contact $v^{16}$, conductors 36 and 35, and other contact 37. The solenoid $v^{11}$ then turns the circuit-changer V another step forwardly, thereby disconnecting the main ring clutch M' from the line and stopping further operation of the ring clutches L'—L⁴ and the pressure rings and connecting the lamp circuit 27 28 to the line through the contact $v^{13}$, ring $v^2$, brush $v^4$, conductor 29, contacts 31, conductor 30, brush $v^5$, ring $v^3$ and contact $v^{14}$.

The lamp circuit is preferably connected to the main line independently of the other electrical devices, through a circuit breaker, to prevent injury to these devices, but this is an ordinary expedient forming no part of the invention and is not herein described or shown in the drawings. When the lamp circuit is thus connected to the line, the electric lamps F³ in this circuit are illuminated and the exposure of the sensitized plate commences, and the operating solenoid for the time controller U is intermittently connected in the lamp circuit by a suitable make and break device automatically operated by a clock or time mechanism. For instance, one side 27 of the lamp circuit 27, 28 is connected to two contacts 46 and 47, Figs. 39 and 43, adapted to be alternately engaged by a clock pendulum 48 or other intermittently operative contact device which is connected by a conductor 49 to one terminal of the solenoid $u^3$, the other terminal of which is connected by a conductor 50 to the other side 28 of the lamp circuit, so that the solenoid is energized intermittently by the engagement of the pendulum contact 48 with the coöperating contacts 46 and 47 and actuates the ratchet and pawl mechanism to intermittently revolve the time controller wheel U. When the contact $u^6$ on this wheel engages the contact U⁶ the solenoid $v^{11}$ is again connected to the line, as before, and turns the circuit-changer V forwardly another step, thereby disconnecting the lamp circuit from the line and extinguishing the lights. The circuit-changer V is thus left with its movable contacts $v^{13}$ $v^{14}$ and $v^{16}$ in a position diametrically opposite to that shown in Fig. 43, in which they are out of engagement with both series of coöperating contacts $v^{15}$ and $v^{17}$, leaving the machine at rest. As the period of time required for the wheel U to make the contact to extinguish the lights is dependent upon the adjustment of the wheel, the length of the exposure is regulated as required by setting the wheel U before starting the operation of the machine. The operator then turns the motor controller to the neutral or off position, sets the time controller wheel as required to determine the length of the next exposure, and actuates the starting switch V², which connects the solenoid $v^{12}$ of the circuit-changer V to the line through one of a pair of contacts 51 on the motor controller, conductors 52, 53, starting switch V², conductor 54 and the other contact 51. The contact 51 is made longer than the other contacts of the motor controller to permit the closing of this solenoid circuit by the starting switch in the neutral or off position of the motor controller. The starting switch is actuated twice so that the solenoid $v^{12}$ moves the circuit-changer backwardly two steps, and places its contacts $v^{13}$ $v^{14}$ in engagement with the third pair of contacts $v^{15}$, and its contact $v^{16}$ in engagement with the third pair of contacts $v^{17}$. The motor controller is then turned to drive the motor in the reverse direction, and the main ring clutch M' is thus connected to the line through one motor controller contact 34, conductor 32, brushes and contacts of the circuit-changer V, conductor 33 and other contact 34, and the main ring clutch M' and its controller T are driven in the reverse direction. The operating clutch for the pressure ring which was last operated is also connected to the line through one of the contacts 34 of the motor controller, conductors 33, 30, 45, brushes and contacts of the circuit-changer V', conductors 44, 36, 29, 32 and the other contact 34, so that this clutch retracts its pressure ring. When the traveling contact $t^9$ of the controller T engages the next pressure ring contact $t^7$, the brushes T⁵ and T⁶ of this controller will be electrically connected, as explained, and connect the solenoid $v^{32}$ of the circuit-changer V' to the line through one of a pair of contacts 55 on the motor controller, conductors 56, 57 42, controller T, conductors 41 and 57 and the other contact 55. The solenoid $v^{32}$ is thus energized and turns the circuit-changer V' backwardly one step so as to disconnect from the line the pressure ring clutch which is in operation and connect the clutch for the next pressure ring to the line through the circuit-changer V⁷ as before. The pressure rings are thus retracted in succession as the traveling contact $t^9$ of the ring controller T engages the successive coöperating contacts $t^7$. When the ring controller T has been returned to its initial position, the contact finger $t^{20}$ thereof engages the stationary contact $T^8$ and connects the solenoid $v^{12}$ of the circuit-changer V to the line through one of the contacts 51 of the motor controller, conductors 52, 53, contacts $v^{17}$ and $v^{16}$, conductors 38, 58, contact $T^9$ of the ring controller T, conductor 59 and the other contact 51. The solenoid thereupon turns the circuit-changer V backwardly another step and places its contacts $v^{13}$ and $v^{14}$ in engagement with the second pair of contacts $v^{15}$, thereby disconnecting the main ring clutch M' from the line and connecting the operating clutch K' for the pressure device to the line in the same manner that the ring clutch was connected to the line. This clutch K' then rotates in a reverse direction and moves the pressure device away from the sensitized plate and rotates the controller S for the pressure device backwardly. When the pressure device is restored to its original position, the contact finger $s^{15}$ of the controller S engages the stationary contact $S^7$ which again connects the solenoid $v^{12}$ to the line, as last explained, and causes the circuit-changer V to turn backwardly another step so as to disconnect the clutch K' from the line and connect the operating clutch for the light chamber to the line. In like manner, when the light chamber reaches its original position the solenoid $v^{12}$ is again connected to the line by the controller R for the light chamber and turns the circuit-changer V another step, leaving it in the initial position shown in Fig. 43, in which its movable contacts $v^{13}$ $v^{14}$ are not in engagement with any of the coöperating contacts. The plate holder can then be adjusted to place the sensitized plate in position for a new exposure, as hereinbefore explained, and the described automatic operation of the machine repeated.

It is to be understood that this invention in its broadest aspect is not restricted to any particular construction of the several component parts or devices of the means for controlling the automatic action of the machine, and that other devices or instrumentalities coöperating in a way analogous to that described for causing the automatic operation of the several parts of the machine in the proper sequence can be employed; and furthermore, means differing from those described but controlled to operate in sequence in the manner described can be employed for actuating the light chamber, pressure device and illuminating means.

In addition to the controlling switches Q Q' of the adjusting mechanism for the plate holder and the starting switch $V^2$, hand switches are preferably included in the several electrical circuits of the machine so that the operation of the various devices of the machine can be controlled independently by the actuation of these switches whenever this may be necessary or desirable for any reason. For instance, as shown in Fig. 43, switches $w$ $w'$ $w^2$ $w^3$ $w^4$ and $w^5$ are placed respectively in the main circuit, the circuits for the light chamber operating clutch, the pressure device operating clutch, the main ring clutch, the individual ring clutches, and the lamps. These switches are preferably located on the main switch-board at the front of the machine, as shown in Fig. 1.

$x$ and $x'$, Fig. 42, represent signal lamps which are placed respectively in the actuating circuits for the clutches E' $E^2$ which operate the adjusting mechanisms for the plate holder B'. Each lamp is illuminated whenever its companion clutch is in operation and serves to indicate to the operator the particular device which is operating. The operating clutches G' and K' for the light chamber and pressure device, the main ring clutch M', the several pressure ring clutches L'—$L^4$ and the time controller U are similarly provided with signal lamps, indicated respectively at $x^2$ $x^3$ $x^4$ $x^5$–$x^{11}$, and $x^{12}$, in Figs. 41 and 43, for the same purpose. The several signal lamps are arranged in a suitable location at the front of the machine, as shown in Figs. 1 and 41. An audible signal or bell $x^{13}$ is also shown in Fig. 40 for notifying the operator when the exposure has been completed and the lights extinguished. This signal is operated by the engagement of a contact $x^{14}$ on the time controller wheel U with a contact $x^{15}$ connected to the bell circuit $x^{16}$. These various signals may be used or not, as preferred.

No claims are made in this application specifically to the micrometer controlling devices N P R and S for the plate holder, light chamber and pressure device, the pressure ring controller T, the controlling switches Q Q' for the plate holder, or the circuit-changing devices V and V', as claims for these devices will be presented in proper divisional applications.

I claim as my invention:

1. In a photographic printing machine, the combination with a light chamber adapted to carry a photographic printing plate, and a holder for a sensitized part, one of which devices is adjustable relative to the other, of means for adjusting said adjustable device, and means which automatically control the operation of said adjusting means and are adapted to be set to produce any predetermined one of different adjustments of said adjustable device, substantially as set forth.

2. In a photographic printing machine, the combination with a light chamber adapted to carry a photographic printing plate, and a holder for a sensitized part, one of which devices is adjustable relative to the other, of power-driven means for adjusting said adjustable device, and means which automatically control the operation of said adjusting means and are adapted to be set to produce any predetermined one of different adjustments of said adjustable device, substantially as set forth.

3. In a photographic printing machine, the combination with a light chamber adapted to carry a photographic printing plate, and a holder for a sensitized part, one of which devices is adjustable relative to the other, of power-driven means including an electrical clutch for adjusting said adjustable device, and electrically controlled means which automatically control the operation of said adjusting means and are adapted to be set to produce any predetermined one of different adjustments of said adjustable device, substantially as set forth.

4. In a photographic printing machine, the combination with a holder for a sensitized part, and photographic means for printing on said sensitized part, of driven means for adjusting said holder to place different portions of said sensitized part in position for printing thereon, and means which automatically control the operation of said adjusting means and are adapted to be set to produce any predetermined one of different adjustments of said holder, substantially as set forth.

5. In a photographic printing machine, the combination with a light chamber adapted to carry a photographic printing plate, and a holder for a sensitized part which is adjustable in two directions to place different portions of said sensitized part opposite to the said printing plate, of means for adjusting said holder, and means which automatically control the operation of said adjusting means and are adapted to be set to produce any predetermined one of different adjustments of said holder in each direction of its movement, substantially as set forth.

6. In a photographic printing machine, the combination with a light chamber adapted to carry a photographic printing plate, and a holder for a sensitized part which is adjustable in two directions to place different portions of said sensitized part opposite to the said printing plate, of means for adjusting said holder, and adjustable devices which automatically control the operation of said adjusting means and are adjustable independently to predetermine the adjustment of said holder in each direction of its movement, substantially as set forth.

7. In a photographic printing machine, the combination with a light chamber adapted to carry a photographic printing plate, and a holder for a sensitized part which is adjustable in two directions to place different portions of said sensitized part opposite to the said printing plate, of clutch-driven means for adjusting said holder in one direction, separate clutch-driven means for adjusting said holder in the other direction, and separate devices which automatically control the operation of said clutch-driven means and are adapted to be independently set to predetermine the adjustment of said holder in each direction of its movement, substantially as set forth.

8. In a photographic printing machine, the combination with a light chamber adapted to carry a photographic printing plate, and a holder for a sensitized part which is adjustable to place said sensitized part in different positions opposite to the printing plate, of driven means for adjusting said holder, a controlling device which is driven with said adjusting means and is adapted to be set to predetermine the adjustment of said holder, and means which are set in action by said controlling device and cause said adjusting means to stop when said holder reaches the predetermined position, substantially as set forth.

9. In a photographic printing machine, the combination with a light chamber adapted to carry a photographic printing plate, and a holder for a sensitized part which is adjustable to place said sensitized part in different positions opposite to the printing plate, of reversible driven means for adjusting said holder in opposite directions, a controlling device which is driven by said adjusting means and is adapted to be set to predetermine the movement in one direction of said holder, and means which act automatically to cause said adjusting means to stop when the holder has moved the predetermined distance in one direction and when said holder has moved in the opposite direction to the initial position, substantially as set forth.

10. In a photographic printing machine, the combination with a light chamber adapted to carry a photographic printing plate, and a holder for a sensitized part which is adjustable to place said sensitized part in different positions opposite to the printing plate, of driven means for adjusting said holder, a controlling device which is driven with said adjusting means and is adapted to be set to predetermine the adjustment of said holder, and electrical means which are set in action by said controlling device when said holder reaches the predetermined position for causing said adjusting means to stop, substantially as set forth.

11. In a photographic printing machine, the combination with a light chamber adapted to carry a photographic printing plate, and a holder for a sensitized part which is adjustable to place said sensitized part in different positions opposite to the printing plate, of mechanism including an electric clutch for adjusting said holder, a controlling device which is driven by said clutch and is adapted to be adjusted to produce different adjustments of said holder, and electrical means which are set in action by said controlling device when said holder reaches the predetermined position for rendering said clutch inactive, substantially as set forth.

12. In a photographic printing machine, the combination with a light chamber adapted to carry a photographic printing plate, and a holder for a sensitized part which is adjustable to place said sensitized part in different positions opposite the printing plate, of mechanism including an electric clutch for adjusting said holder, a switch for starting said adjusting means, a controlling device which is driven by said clutch and is adapted to be adjusted to produce different adjustments of said holder, and electrical means which are set in action by said controlling device when said holder reaches the predetermined position for rendering said clutch inactive, substantially as set forth.

13. In a photographic printing machine, the combination with a light chamber adapted to carry a photographic printing plate, and a holder for a sensitized part which is adjustable to place said sensitized part in different positions opposite to the printing plate, of means for adjusting said holder, an electric clutch for driving said means, a switch and electrical connections for energizing said clutch, a controlling device which is driven by said clutch, and means actuated by said controlling device when said holder reaches a predetermined position for operating said switch to deënergize said clutch, substantially as set forth.

14. In a photographic printing machine, the combination with a light chamber adapted to carry a photographic printing plate, and a holder for a sensitized part, of means for adjusting one of said devices to place different portions of said sensitized part in position for printing thereon, means for adjusting one of said devices toward and from the other, and means which automatically control the operation of both of said adjusting means and are adapted to be independently set to predetermine both of said adjustments, substantially as set forth.

15. In a photographic printing machine, the combination with a light chamber adapted to carry a photographic printing plate, and a holder for a sensitized part, of means for adjusting said holder to place different portions of said sensitized part in position for printing thereon, means for moving said light chamber toward and from said holder, and means which are adapted to be set independently to predetermine the adjustment of said holder and the movement of said light chamber and which operate automatically to control the operation of said adjusting and moving means, substantially as set forth.

16. In a photographic printing machine, the combination with a light chamber adapted to carry a photographic printing plate, and a holder for a sensitized part, of driven means for adjusting said light chamber toward and from said holder, and means which automatically control the operation of said adjusting means and are adapted to be set to predetermine the adjustment of said light chamber toward said holder, substantially as set forth.

17. In a photographic printing machine, the combination with a holder for a sensitized part, a light chamber adapted to carry a photographic printing plate, and a pressure device for pressing said sensitized part against said printing plate, of driven means for adjusting said pressure device toward and from said holder, and means which automatically control the operation of said adjusting means and are adapted to be set to predetermine the adjustment of said pressure device toward said holder, substantially as set forth.

18. In a photographic printing machine, the combination with a holder for a sensitized part, a light chamber adapted to carry a photographic printing plate, and a pressure device for pressing said sensitized part against said printing plate, of driven means for adjusting said light chamber toward and from said holder, driven means for adjusting said pressure device toward and from said holder, and means which are adapted to be set independently to predetermine the adjustments of said light chamber and said pressure device toward said holder and which operate automatically to control the operation of said adjusting means, substantially as set forth.

19. In a photographic printing machine, the combination with a holder for a sensitized part, a light chamber adapted to carry a photographic printing plate, and a pressure device for pressing said sensitized part against said printing plate, of driven means for adjusting said holder to place different portions of said sensitized part in position for printing thereon and for adjusting said light chamber and said pressure device toward and from said holder, and means which are adapted to be set independently to predetermine the adjustments of said light chamber and said pressure device toward said holder and which operate automatically to control the operation of said adjusting means, substantially as set forth.

20. In a photographic printing machine, the combination with a holder for a sensitized part, a light chamber adapted to carry a photographic printing plate, and a pressure device for pressing said sensitized part against said printing plate, of driven means for adjusting one of said devices relative to the others, a controlling device which is driven with said adjusting means and is adapted to be set to predetermine the adjustment of said adjustable device, and means which are set in action by said controlling device and cause said adjusting means to stop when said adjustable device reaches the predetermined position, substantially as set forth.

21. In a photographic printing machine, the combination with a holder for a sensitized part, a light chamber adapted to carry a photographic printing plate, and a pressure device for pressing said sensitized part against said printing plate, of driven means for adjusting each of said devices relative to the others, a controlling device which is driven by the adjusting means for each of said adjustable devices and is adapted to be set to predetermine the adjustment of said adjustable device, and means which are set in action by said controlling device and cause said adjusting means to stop when said adjustable device reaches the predetermined position, substantially as set forth.

22. In a photographic printing machine, the combination with a holder for a sensitized part, a light chamber adapted to carry a photographic printing plate, and a pressure device for pressing said sensitized part against said printing plate, of mechanism for adjusting said holder to place different portions of said sensitized part in position for printing thereon, driven mechanism for adjusting said light chamber and said pressure device toward and from said holder, a controlling device which is driven with the adjusting mechanism for said light chamber and is adapted to be set to predetermine the adjustment of said light chamber, and means which are set in action by said controlling device and cause said adjusting mechanism for the light chamber to stop when the light chamber reaches the predetermined position, substantially as set forth.

23. In a photographic printing machine, the combination with a holder for a sensitized part, a light chamber adapted to carry a photographic printing plate, and a pressure device for pressing said sensitized part against said printing plate, of mechanism for adjusting said holder to place different portions of said sensitized part in position for printing thereon, driven mechanisms for adjusting said light chamber and said pressure device toward and from said holder, a controlling device which is driven with the adjusting mechanism for said pressure device and is adapted to be set to predetermine the adjustment of said pressure device, and means which are set in action by said controlling device and cause said adjusting mechanism for the pressure device to stop when the pressure device reaches the predetermined position, substantially as set forth.

24. In a photographic printing machine, the combination with a holder for a sensitized part, a light chamber adapted to carry a photographic printing plate, and a pressure device for pressing said sensitized part against said printing plate, of means for adjusting said holder to place different portions of said sensitized part in position for printing thereon, driven mechanisms for adjusting said light chamber and said pressure device toward and from said holder, a controlling device which is driven with each of said adjusting mechanisms and is adapted to be set to predetermine the adjustment of the device actuated by said adjusting mechanism, and means which are set in action by said controlling device and cause said adjusting mechanism to stop when the device actuated by said adjusting mechanism reaches the predetermined position, substantially as set forth.

25. In a photographic printing machine, the combination with a holder for a sensitized part, and a light chamber adapted to support a printing plate in printing relation to said sensitized part, of driven means for adjusting one of said devices relative to the other, a controlling device comprising a member which is driven with said adjusting means, and a member which is adapted to be adjusted to predetermine the adjustment of said adjustable device, and means which act automatically to cause said adjusting means to stop when said driven member arrives at a position corresponding to the adjusted position of said adjustable member, substantially as set forth.

26. In a photographic printing machine, the combination with a holder for a sensitized part, and a light chamber adapted to support a printing plate in printing relation to said sensitized part, of driven means for adjusting one of said devices relative to the other, a controlling device comprising a wheel which is driven by said adjusting means, and a wheel which is adapted to be adjusted to predetermine the adjustment of said adjustable device, and means which act automatically to cause said adjusting means to stop when said driven wheel arrives at a position corresponding to the adjusted position of said adjustable wheel, substantially as set forth.

27. In a photographic printing machine, the combination with a holder for a sensitized part, and a light chamber adapted to support a printing plate in printing relation to said sensitized part, of driven means for adjusting one of said devices relative to the other, a controlling device comprising a member which is driven with said adjusting means, and a member which is adapted to be adjusted to predetermine the adjustment of said adjustable device, and electrical means which are set in operation by said controlling device for causing said adjusting means to stop when said driven member arrives at a position corresponding to the adjusted position of said adjustable member, substantially as set forth.

28. In a photographic printing machine, the combination with a holder for a sensitized part, a light chamber adapted to carry a photographic printing plate, and a pressure device for pressing said sensitized part against said printing plate, of driven means for adjusting one of said devices relative to the others, a controlling device comprising a member which is driven with said adjusting means, and a member which is adapted to be adjusted to predetermine the adjustment of said adjustable device, and means which act automatically to cause said adjusting means to stop when said driven member arrives at a position corresponding to the adjusted position of said adjustable member, substantially as set forth.

29. In a photographic printing machine, the combination with a holder for a sensitized part, a light chamber adapted to carry a photographic printing plate, and a pressure device for pressing said sensitized part against said printing plate, of driven means for adjusting each of said devices relative to the others, a controlling device for each of said adjustable devices comprising a member which is driven with said adjusting means, and a member which is adapted to be adjusted to predetermine the adjustment of said adjustable device, and means which act automatically to cause said adjusting means to stop when said driven member arrives at a position corresponding to the adjusted position of said adjustable member, substantially as set forth.

30. In a photographic printing machine, the combination with a holder for a sensitized part, and a light chamber adapted to support a printing plate in printing relation to said sensitized part, of driven means for adjusting one of said devices relative to the other, a controlling device comprising two wheels which are driven with said adjusting means and revolve at differential speeds, and two wheels which are adapted to be adjusted to predetermine the movement of said adjustable device, and means which act automatically to cause said adjusting means to stop when said driven wheels arrive at positions corresponding respectively to the adjusted positions of said adjustable wheels, substantially as set forth.

31. In a photographic printing machine, the combination with a holder for a sensitized part, and a light chamber adapted to support a printing plate in printing relation to said sensitized part, of driven means for adjusting one of said devices relative to the other, a controlling device comprising units and fractions wheels which are adapted to be adjusted to predetermine the movement in inches and fractions thereof of said adjustable device, a driven units wheel which revolves a distance proportional to the travel of said adjustable device, and a driven fractions wheel which revolves once during each inch of travel of said adjustable device, and means which act automatically to cause said adjusting means to stop when said driven units and fractions wheels arrive at positions corresponding respectively to the adjusted positions of said adjustable units and fractions wheels, substantially as set forth.

32. In a photographic printing machine, the combination with a holder for a sensitized part, a light chamber adapted to carry a photographic printing plate, and a pressure device for pressing said sensitized part against said printing plate, of driven means for adjusting one of said devices relative to the others, a controlling device comprising units and fractions wheels which are adapted to be adjusted to predetermine the movement in inches and fractions thereof of said adjustable device, a driven units wheel which revolves a distance proportional to the travel of said adjustable device, and a driven fractions wheel which revolves once during each inch of travel of said adjustable device, and electrical means which act to cause said adjusting means to stop when said driven units and fractions wheels arrive at positions corresponding respectively to the adjusted positions of said adjustable units and fractions wheels, substantially as set forth.

33. In a photographic printing machine, the combination with a holder for a sensitized part, a light chamber adapted to carry a photographic printing plate, and a pressure device for pressing said sensitized part against said printing plate, of driven mechanisms for moving the light chamber and the pressure device toward said holder, and means which act automatically to stop the moving mechanism for the light chamber and start the moving mechanism for the pressure device when the light chamber reaches a predetermined position, substantially as set forth.

34. In a photographic printing machine, the combination with a holder for a sensitized part, a light chamber adapted to carry a photographic printing plate, and a pressure device for pressing said sensitized part against said printing plate, of driven mechanisms for moving the light chamber and the pressure device toward said holder, and means which act automatically to stop the moving mechanism for the light chamber and start the moving mechanism for the pressure device when the light chamber reaches a predetermined position and to stop the moving means for the pressure device when the pressure device reaches a predetermined position, substantially as set forth.

35. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, and means which act automatically to stop the moving mechanism for the light chamber and start the moving mechanism for the pressure device when the light chamber reaches a predetermined position and to stop the moving means for the pressure device when the pressure device reaches a predetermined position and thereafter illuminate said electric lamp, substantially as set forth.

36. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, and means which act automatically to stop the moving mechanism for the light chamber and start the moving mechanism for the pressure device when the light chamber reaches a predetermined position and to stop the moving means for the pressure device when the pressure device reaches a predetermined position and thereafter illuminate said electric lamp and extinguishing said lamp after a predetermined period of time, substantially as set forth.

37. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, starting means for setting in action the moving mechanism for the light chamber, and means which act automatically to stop the moving mechanism for the light chamber and start the moving mechanism for the pressure device when the light chamber reaches a predetermined position and to stop the moving mechanism for the pressure device when the pressure device reaches a predetermined position and thereafter illuminate said lamp, substantially as set forth.

38. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, a controlling device and means set in action thereby when the light chamber reaches a predetermined position to stop the moving means for the light chamber and start the moving means for the pressure device, and a controlling device and means set in action thereby when the pressure device reaches a predetermined position to stop the moving means for the pressure device and thereafter illuminate said lamp, substantially as set forth.

39. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, starting means for setting in action the moving mechanism for the light chamber, and means which act automatically to stop the moving mechanism for the light chamber and start the moving mechanism for the pressure device when the light chamber has moved a predetermined distance toward said holder and to stop the moving mechanism for said pressure device when the pressure device has moved a predetermined distance toward said holder and thereafter illuminate said lamp, said moving mechanism being reversible to move the light chamber and pressure device away from said holder, and said controlling devices and means acting to cause the pressure device to first move away from said holder and then the light chamber to move away from said holder, substantially as set forth.

40. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, and controlling means which act automatically and cause one of said devices to first move a predetermined distance toward said holder, then said other device to move a predetermined distance toward the holder and thereafter the lamp to be illuminated, substantially as set forth.

41. In a photographic printing machine, the combination with a holder for a sensitized part, a light chamber adapted to carry a photographic printing plate, an electric lamp, and a pressure device for pressing said sensitized part against said printing plate, of driven mechanisms for moving the light chamber and the pressure device toward said holder, and controlling means which act automatically and cause one of said devices to first move a predetermined distance toward said holder, then said other device to move a predetermined distance toward the holder and thereafter the lamp to be illuminated, said moving mechanisms being reversible to move the light chamber and the pressure device away from said holder, and said controlling means acting automatically to cause the light chamber and the pressure device to be moved away from said holder in the reverse order, substantially as set forth.

42. In a photographic printing machine, the combination with a holder for a sensitized part, means for supporting and illuminating a photographic printing plate, and a pressure device for said sensitized part which comprises a plurality of independently movable pressure sections, of means for operating said pressure device to cause said pressure sections to successively apply pressure to said sensitized part, and automatic controlling means for said pressure device which are adapted to be set to predetermine the number of said pressure sections to be brought into action, substantially as set forth.

43. In a photographic printing machine, the combination with a holder for a sensitized part, a light chamber adapted to carry a photographic printing plate, and a pressure device for said sensitized part which comprises a plurality of independently movable pressure sections, of means for operating said pressure sections, and automatic controlling means for said pressure sections which are adapted to be set to predetermine the number of said pressure sections to be operated, substantially as set forth.

44. In a photographic printing machine, the combination with a holder for a sensitized part, means for supporting and illuminating a photographic printing plate, and a pressure device for said sensitized part which comprises a plurality of independently movable pressure sections, driven means for operating said pressure sections in succession, and controlling means which are adapted to be set to predetermine the number of said pressure sections to be operated and which act automatically to stop the operating means for said pressure sections when the predetermined number of sections has been operated, substantially as set forth.

45. In a photographic printing machine, the combination with a holder for a sensitized part, means for supporting and illuminating a photographic printing plate, and a pressure device for said sentitized part which comprises a plurality of independently movable pressure sections, power-operated mechanism for adjusting said pressure device relative to said holder and for operating said pressure sections in succession, and automatic controlling means for said pressure sections which are adapted to be set to predetermine the number of said sections to be operated, substantially as set forth.

46. In a photographic printing machine, the combination with a holder for a sensitized part, means for supporting and illuminating a photographic printing plate, and a pressure device for said sensitized part which comprises a plurality of independently movable pressure sections, a driven controlling device which is adapted to be set to predetermine the number of said pressure sections to be operated, and means which are set in operation by said controlling device for moving said pressure sections, substantially as set forth.

47. In a photographic printing machine, the combination with a holder for a sensitized part, means for supporting and illuminating a photographic printing plate, and a pressure device for said sensitized part which comprises a plurality of independently movable pressure sections, a driven controlling device which is adapted to be set to predetermine the number of said pressure sections to be operated, electrical clutches for actuating said pressure sections, and electrical means controlled by said controlling device for operating said clutches in succession, substantially as set forth.

48. In a photographic printing machine, the combination with a holder for a sensitized part, a light chamber adapted to carry a photographic printing plate, and a pressure device for said sentitized part which comprises a plurality of independently movable pressure sections, of automatic mechanism which adjusts the light chamber and the pressure device toward the sensitized part one after the other and then operates said pressure sections to independently apply pressure to said sensitized part, substantially as set forth.

49. In a photographic printing machine, the combination with a holder for a sensitized part, a light chamber adapted to carry a photographic printing plate, and a pressure device for said sensitized part which comprises a plurality of independently movable pressure sections, of automatically operating mechanism which acts first to adjust the light chamber toward the sensitized part, then to adjust the pressure device toward the sensitized part, and then to operate said pressure sections in succession to apply pressure to the sensitized part, said mechanism including means which are adjustable to cause the operation of one or more of said pressure sections, substantially as set forth.

50. In a photographic printing machine, the combination with a holder for a sensitized part, a light chamber adapted to carry a photographic printing plate, a pressure device for said sensitized part which comprises a plurality of independently movable pressure sections, and an electric lamp, of driven mechanisms for moving the light chamber and the pressure device toward said holder and operating said pressure sections, controlling means which act when the light chamber reaches a predetermined position to stop the moving mechanism for the light chamber and start the moving mechanism for the pressure device, controlling means which act when the pressure device reaches a predetermined position to stop the moving mechanism for the pressure device and start the operating mechanism for said pressure sections, and controlling means which act when a predetermined number of pressure sections have been operated to stop the operating mechanism for said pressure sections and illuminate said lamp, substantially as set forth.

51. In a photographic printing machine, the combination with a holder for a sensitized part, a light chamber adapted to carry a photographic printing plate, a pressure device for said sensitized part which comprises a plurality of independently movable pressure sections, and an electric lamp, of driven mechanisms for moving the light chamber and the pressure device toward said holder and operating said pressure sections, controlling means which act when the light chamber reaches a predetermined position to stop the moving mechanism for the light chamber and start the moving mechanism for the pressure device, controlling means which act when the pressure device reaches a predetermined position to stop the moving mechanism for the pressure device and start the operating mechanism for said pressure sections, controlling means which act when a predetermined number of pressure sections have been operated to stop the operating mechanism for said pressure sections and illuminate said lamp, and means which are set in action by said last mentioned controlling means and act to extinguish said lamp after a predetermined period of time, substantially as set forth.

52. In a photographic printing machine, the combination with a holder for a sensitized part, a light chamber adapted to carry a photographic printing plate, a pressure device for said sensitized part which comprises a plurality of independently movable pressure sections, and an electric lamp, of power-operated means for actuating said pressure sections in succession, controlling means which act when a predetermined number of pressure sections have been operated to stop the operating means for said pressure sections and illuminate said lamp, and means which are set in action by said controlling means and act to extinguish said lamp after a predetermined period of time, substantially as set forth.

53. In a photographic printing machine, the combination with means for holding a sensitized part, and photographic means for printing on said sensitized part, of driven mechanism for adjusting one of said means to place different portions of said sensitized part in position for printing thereon, a controlling device which is driven with said adjusting mechanism and is adapted to be set to predetermine the adjustment of said adjustable means, and means which are set in action by said controlling device and cause said adjusting mechanism to stop when said adjustable means reach the predetermined position, substantially as set forth.

54. In a photographic printing machine, the combination with means for holding a sensitized part, and photographic means for printing on said sensitized part, of driven mechanism for adjusting one of said means to place different portions of said sensitized part in position for printing thereon, a controlling device comprising a member which is driven with said adjusting mechanism, and a member which is adapted to be adjusted to predetermine the adjustment of said adjustable means, and electrical means which are set in operation by said controlling device for causing said adjusting mechanism to stop when said driven member arrives at a position corresponding to the adjusted position of said adjustable member, substantially as set forth.

55. In a photographic printing machine, the combination with a holder for a sensitized part, a light chamber adapted to carry a photographic printing plate, and a pressure device for said sensitized part, of reversible mechanisms each including a clutch for moving the light chamber and the pressure device toward and from said holder, a controlling device for each of said clutches which is driven by the clutch and is adjustable to control the action of the clutch, and means actuated by said controlling devices for effecting the movement of the light chamber and the pressure device one after the other, substantially as set forth.

56. In a photographic printing machine, the combination with a holder for a sensitized part, a light chamber adapted to carry a photographic printing plate, and a pressure device for said sensitized part comprising a plurality of independently movable sections, of reversible drive mechanisms each including a clutch for moving the light chamber and for operating said pressure sections to apply pressure in succession to the sensitized part, controlling devices for said clutches which are driven by the clutches and are adjustable to control the action of the clutches, and means actuated by said controlling devices for first effecting the movement of the light chamber and then the operation of said pressure device, substantially as set forth.

57. In a photographic printing machine, the combination with a holder for a sensitized part, a light chamber adapted to carry a photographic printing plate, and a pressure device for said sensitized part comprising a plurality of independently movable sections, of reversible drive mechanisms each including a clutch for moving the light chamber and the pressure device toward and from the said holder and for operating said pressure sections independently, and controlling means including devices which are adjustable for controlling the action of said clutches and which cause the operation of the light chamber, the pressure device and the pressure sections one after the other, substantially as set forth.

58. In a photographic printing machine, the combination with a holder for a sensitized part, a light chamber adapted to carry a photographic printing plate, and a pressure device for said sensitized part, of reversible mechanisms each including an electric clutch for moving the light chamber and the pressure device toward and from said holder, a controlling device for each of said clutches which is adjustable to control the action of the clutch, and a circuit-changing mechanism controlled by said controlling devices for connecting said clutches with and disconnecting them from a source of current one after the other, substantially as set forth.

59. In a photographic printing machine, the combination with a holder for a sensitized part, a light chamber adapted to carry a photographic printing plate, and a pressure device for said sensitized part, of reversible mechanisms each including an electric clutch for moving the light chamber and the pressure device toward and from said holder, a circuit-changing device for connecting said clutches with and disconnecting them from a source of current one after the other, and devices which control said circuit-changing device and are adjustable to control the action of said clutches, substantially as set forth.

60. In a photographic printing machine, the combination with a holder for a sensitized part, a light chamber adapted to carry a photographic printing plate, and a pressure device for said sensitized part, of reversible electrically actuated mechanisms for moving the light chamber and the pressure device toward and from said holder, a circuit-changing device for connecting said mechanisms with and disconnecting them from a source of current one after the other, and adjustable devices for controlling the action of said circuit-changing device, substantially as set forth.

61. In a photographic printing machine, the combination with a holder for a sensitized part, a light chamber adapted to carry a photographic printing plate and provided with an electric lamp, and a pressure device for said sensitized part, of electrically actuated mechanisms for moving the light chamber and the pressure device toward and from said holder, circuit-changing means for connecting said mechanisms and said lamp with and disconnecting them from a source of current one after the other, and adjustable devices for controlling the action of said circuit-changing means, substantially as set forth.

62. In a photographic printing machine, the combination with means for supporting a printing plate, and a holder for a sensitized part, of a pressure device for pressing said sensitized part against said printing plate comprising a supporting frame, a plurality of concentric movable pressure sections carried by said frame, and means for operating said sections to cause them to independently apply pressure to said sensitized part, substantially as set forth.

63. In a photographic printing machine, the combination with means for supporting a printing plate, and a holder for a sensitized part, of a pressure device for pressing said sensitized part against said printing plate comprising a supporting frame, a pressure head movably mounted on said frame, a plurality of concentric movable pressure sections carried by said frame, and means for moving said sections in succession commencing with the central section to apply pressure to said head, substantially as set forth.

64. In a photographic printing machine, the combination with means for supporting a printing plate, and a holder for a sensitized part, of a pressure device for pressing said sensitized part against said printing plate comprising a supporting frame, a pressure head movably mounted on said frame, a plurality of concentric movable pressure rings having screw-threaded engagement with said frame, and means for turning said rings independently to advance them for applying pressure to said head, substantially as set forth.

65. In a photographic printing machine, the combination with means for supporting a printing plate, and a holder for a sensitized part, of a pressure device for pressing said sensitized part against said printing plate comprising a supporting frame, a pressure head movably mounted on said frame, a plurality of concentric movable pressure rings having screw threads engaging screw-threaded parts of said frame, gearing for turning said rings to advance them for applying pressure to said head, and means for operating said gearing to advance said rings in succession, substantially as set forth.

66. In a photographic printing machine, the combination with means for supporting a printing plate, and a holder for a sensitized part, of a pressure device for pressing said sensitized part against said printing plate comprising a supporting frame, a pressure head movably mounted on said frame, a plurality of concentric movable pressure rings having screw-threaded engagement with said frame, means for turning said rings independently to advance them for applying pressure to said head, and a wear plate movably mounted between said head and said rings, substantially as set forth.

67. In a photographic printing machine, the combination with means for supporting a printing plate, and a holder for a sensitized part, of a pressure device for pressing said sensitized part against said printing plate comprising a supporting frame, a pressure head, means for removably securing said head on said frame, a plurality of movable pressure sections carried by said frame, and means for moving said sections independently to apply pressure to said head, substantially as set forth.

68. In a photographic printing machine, the combination with means for supporting a printing plate, and a holder for a sensitized part, of a pressure device for pressing said sensitized part against said printing plate comprising a supporting frame, a pressure head, means for adjusting said head angularly on said frame, a plurality of movable pressure sections carried by said frame, and means for moving said sections independently to apply pressure to said head, substantially as set forth.

69. In a photographic printing machine, the combination with means for supporting a printing plate, and a holder for a sensitized part, of a pressure device for pressing said sensitized part against said printing plate comprising a supporting frame, a pressure head, a supporting bar on which said head is removably held, means for adjusting said bar, a plurality of movable pressure sections carried by said frame, and means for operating said pressure sections to apply pressure to said head, substantially as set forth.

70. In a photographic printing machine, the combination with means for supporting a printing plate, and a holder for a sensitized part, of a pressure device for pressing said sensitized part against said printing plate comprising a supporting frame, a plurality of movable pressure sections carried by said frame, means for adjusting said pressure device toward said sensitized part, clutches carried by said frame and geared to said sections for moving them to apply pressure to said head, and means for operating said clutches to operate said sections independently, substantially as set forth.

71. In a photographic printing machine, the combination with a holder for a sensitized part, of a light chamber which is adjustable toward and from said holder and comprises a section adapted to carry a printing plate, and a section which carries a lamp, said sections being adjustable toward and from each other, substantially as set forth.

72. In a photographic printing machine, the combination with a holder for a sensitized part, a light chamber adapted to carry a photographic printing plate, and a pressure device for pressing said sensitized part against said printing plate, of holding means for said printing plate which are angularly adjustable, and means for adjusting said pressure device angularly to correspond with the angular adjustment of the printing plate, substantially as set forth.

73. In a photographic printing machine, the combination with a holder for a sensitized part, of a light chamber adapted to carry a photographic printing plate and adapted to be opened at the back, a lamp in said chamber, and a movable support for said lamp adapted to be moved to remove said lamp from the light chamber when said back is opened, substantially as set forth.

74. In a photographic printing machine, the combination with a holder for a sensitized part, of a light chamber adapted to carry a photographic printing plate and having a removable back, a lamp, and a frame which supports the lamp in the light chamber and is adapted to swing when said back is removed to remove the lamp from the light chamber, substantially as set forth.

75. In a photographic printing machine, the combination with a holder for a sensitized part, of a light chamber adapted to carry a photographic printing plate, a screen roller mounted at each side of the light chamber, flexible screens attached to said rollers, a guide rod at each side of the light chamber, and guide loops on each screen slidably engaging two opposite guide rods, substantially as set forth.

76. In a photographic printing machine, the combination with a holder for a sensitized part, of a light chamber adapted to carry a photographic printing plate, means for adjusting the light chamber toward and from said holder, one or more lamps which are mounted in the light chamber and are movable therewith, and mechanism for circulating the lamp or lamps in the light chamber, substantially as set forth.

77. In a photographic printing machine, the combination with a holder for a sensitized part, of a light chamber adapted to carry a photographic printing plate, one or more lamps which are mounted in the light chamber, mechanism for circulating the lamp or lamps in the light chamber, and means for placing said circulating mechanism into and out of action at will, substantially as set forth.

78. In a photographic printing machine, the combination with a holder for a sensitized part, of a light chamber adapted to carry a photographic printing plate, one or more lamps in the light chamber, a lamp-supporting frame, a frame in which said lamp-supporting frame is movable in one direction and which is movable in another direction, and mechanism for simultaneously reciprocating said frames to circulate the lamp or lamps, substantially as set forth.

Witness my hand, this 9th day of May, 1910.

WILLIAM C. HUEBNER.

Witnesses:
C. W. PARKER,
C. B. HORNBECK.